(12) United States Patent
Abari et al.

(10) Patent No.: US 11,686,836 B2
(45) Date of Patent: *Jun. 27, 2023

(54) REAL-TIME AND DYNAMIC LOCALIZATION USING ACTIVE DOPPLER SENSING SYSTEMS FOR VEHICLES

(71) Applicant: Pony AI Inc., Grand Cayman (KY)

(72) Inventors: Cyrus F. Abari, San Bruno, CA (US); Harsh Mohan, Fremont, CA (US); Haomin Wang, Pittsburgh, PA (US); Piaoyang Cui, Santa Clara, CA (US)

(73) Assignee: Pony AI Inc., Grand Cayman (KY)

( * ) Notice: Subject to any disclaimer, the term of this patent is extended or adjusted under 35 U.S.C. 154(b) by 267 days.

This patent is subject to a terminal disclaimer.

(21) Appl. No.: 16/786,863

(22) Filed: Feb. 10, 2020

(65) Prior Publication Data

US 2021/0215808 A1 Jul. 15, 2021

Related U.S. Application Data

(60) Provisional application No. 62/960,446, filed on Jan. 13, 2020.

(51) Int. Cl.
| | | |
|---|---|---|
| *G01S 13/52* | (2006.01) | |
| *G01S 7/40* | (2006.01) | |
| *G01S 7/497* | (2006.01) | |
| *G01S 13/931* | (2020.01) | |

(52) U.S. Cl.
CPC ............... *G01S 13/52* (2013.01); *G01S 7/40* (2013.01); *G01S 7/497* (2013.01); *G01S 13/931* (2013.01); *G01S 2013/932* (2020.01); *G01S 2013/9323* (2020.01); *G01S 2013/9324* (2020.01)

(58) Field of Classification Search
CPC ... G01S 7/40–4047; G01S 7/497–4972; G01S 7/52004–52006; G01S 7/5205–52052; G01S 13/52; G01S 13/931; G01S 2013/932; G01S 2013/9323; G01S 2013/9324; G05D 1/0257
See application file for complete search history.

(56) References Cited

U.S. PATENT DOCUMENTS

| | | | | |
|---|---|---|---|---|
| 5,928,309 A | * | 7/1999 | Korver | ................. G01C 21/165 701/470 |
| 5,964,822 A | * | 10/1999 | Alland | .................... G01S 13/42 701/301 |
| 5,986,547 A | * | 11/1999 | Korver | ................. G01S 5/0247 246/121 |
| 10,088,553 B2 | * | 10/2018 | Zeng | ................... B60W 40/105 |
| 10,114,106 B2 | * | 10/2018 | Schiffmann | ........... G01S 7/4026 |

(Continued)

FOREIGN PATENT DOCUMENTS

| | | | | |
|---|---|---|---|---|
| CN | 107976657 A | * | 5/2018 | ............. G01S 13/86 |
| CN | 110515051 A | * | 11/2019 | ............... G01S 7/40 |

(Continued)

*Primary Examiner* — Matthew M Barker

(57) ABSTRACT

Provided herein is a system on a vehicle, the system comprising an active Doppler sensor; one or more processors; and a memory storing instructions that, when executed by the one or more processors, causes the system to perform: obtaining a Doppler signature from each of one or more entities; and determining one or more calibration parameters of the active Doppler sensor based on the Doppler signature from at least a portion of the one or more entities.

15 Claims, 20 Drawing Sheets

(56) References Cited

U.S. PATENT DOCUMENTS

| | | | |
|---|---|---|---|
| 10,473,780 B1 | 11/2019 | Brown | |
| 10,481,243 B2 * | 11/2019 | Alcalde | G01S 13/64 |
| 10,691,135 B2 | 6/2020 | Campbell et al. | |
| 10,698,084 B2 * | 6/2020 | Mielenz | G01S 13/931 |
| 11,119,190 B2 * | 9/2021 | Morinaga | G01S 7/40 |
| 2011/0184605 A1 * | 7/2011 | Neff | G05D 1/0255 |
| | | | 701/25 |
| 2015/0276923 A1 * | 10/2015 | Song | G01S 7/4026 |
| | | | 702/97 |
| 2016/0209211 A1 * | 7/2016 | Song | G01S 7/4026 |
| 2019/0094877 A1 | 3/2019 | Smith et al. | |
| 2019/0250616 A1 * | 8/2019 | Ramanujam | G07C 5/085 |
| 2019/0384294 A1 * | 12/2019 | Shashua | G01C 21/32 |
| 2020/0011970 A1 * | 1/2020 | Abari | G01S 13/931 |
| 2020/0180612 A1 * | 6/2020 | Finelt | G01C 21/365 |
| 2020/0209354 A1 * | 7/2020 | Sumin | G01S 7/4026 |
| 2020/0309937 A1 * | 10/2020 | Buddendick | G01S 7/4026 |

FOREIGN PATENT DOCUMENTS

| | | | | |
|---|---|---|---|---|
| EP | 0975989 B1 * | 6/2006 | | G01S 19/49 |
| EP | 1873033 A1 * | 1/2008 | | B60W 40/101 |
| WO | WO-2018175441 A1 * | 9/2018 | | G05D 1/0214 |

\* cited by examiner

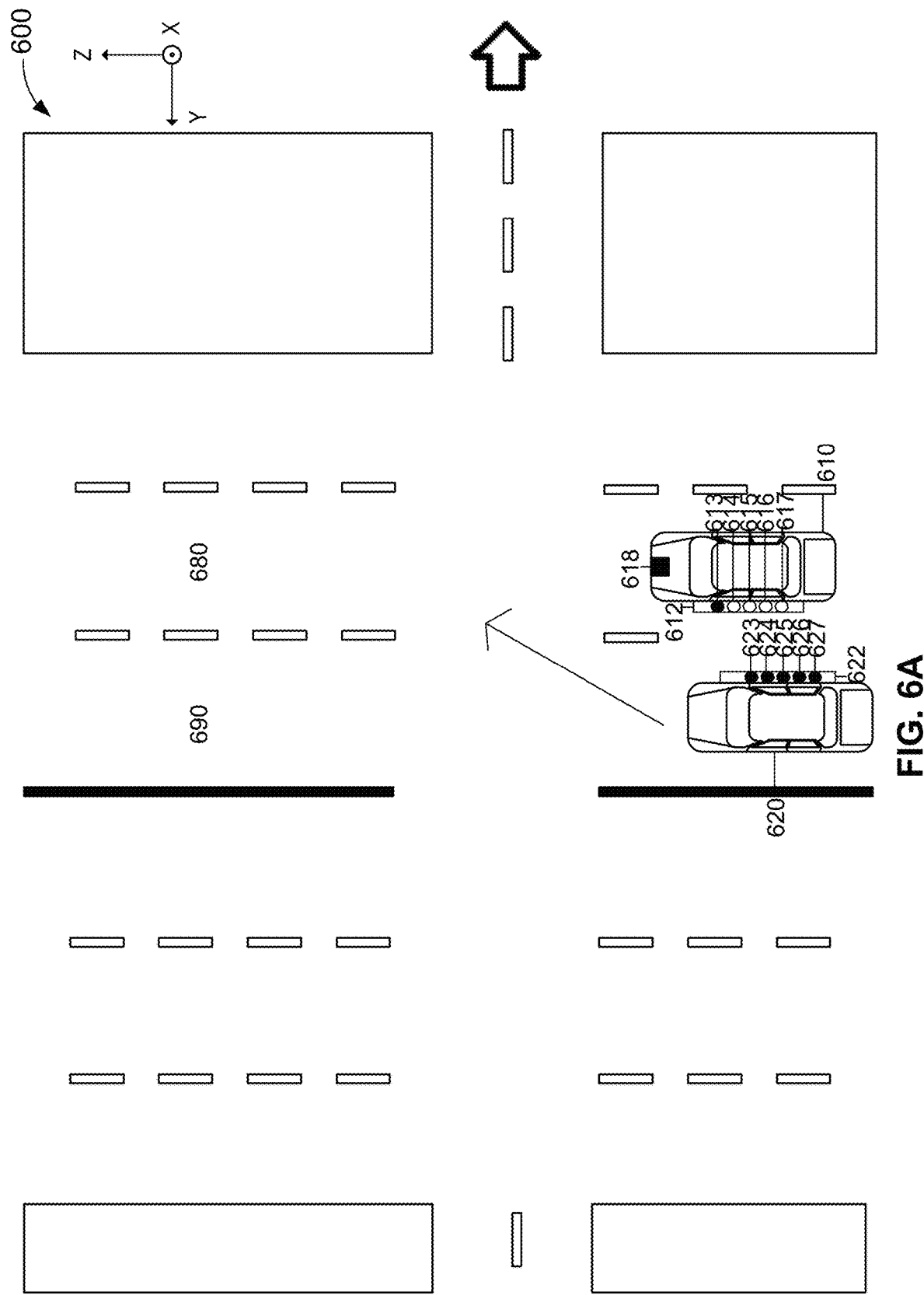

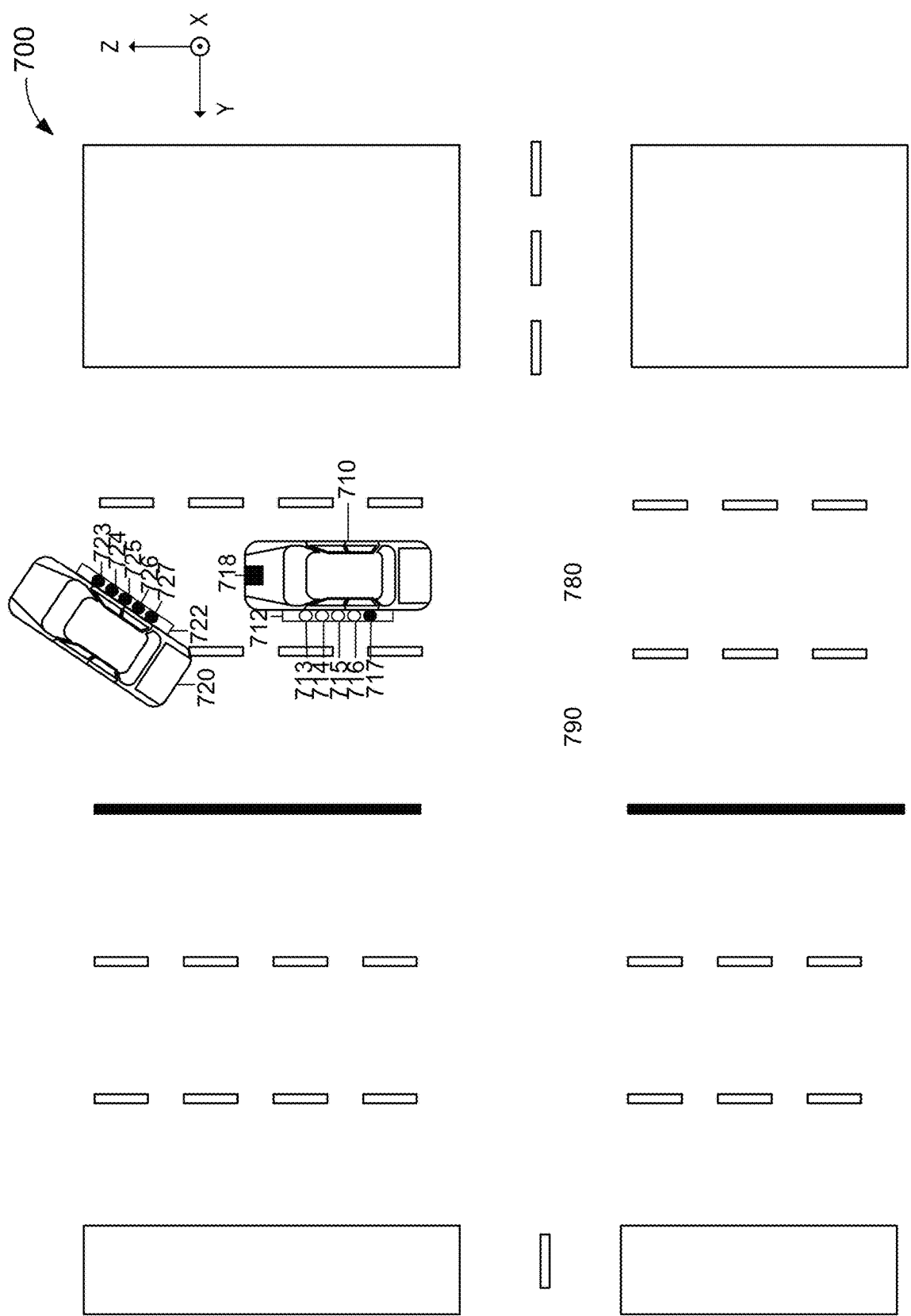

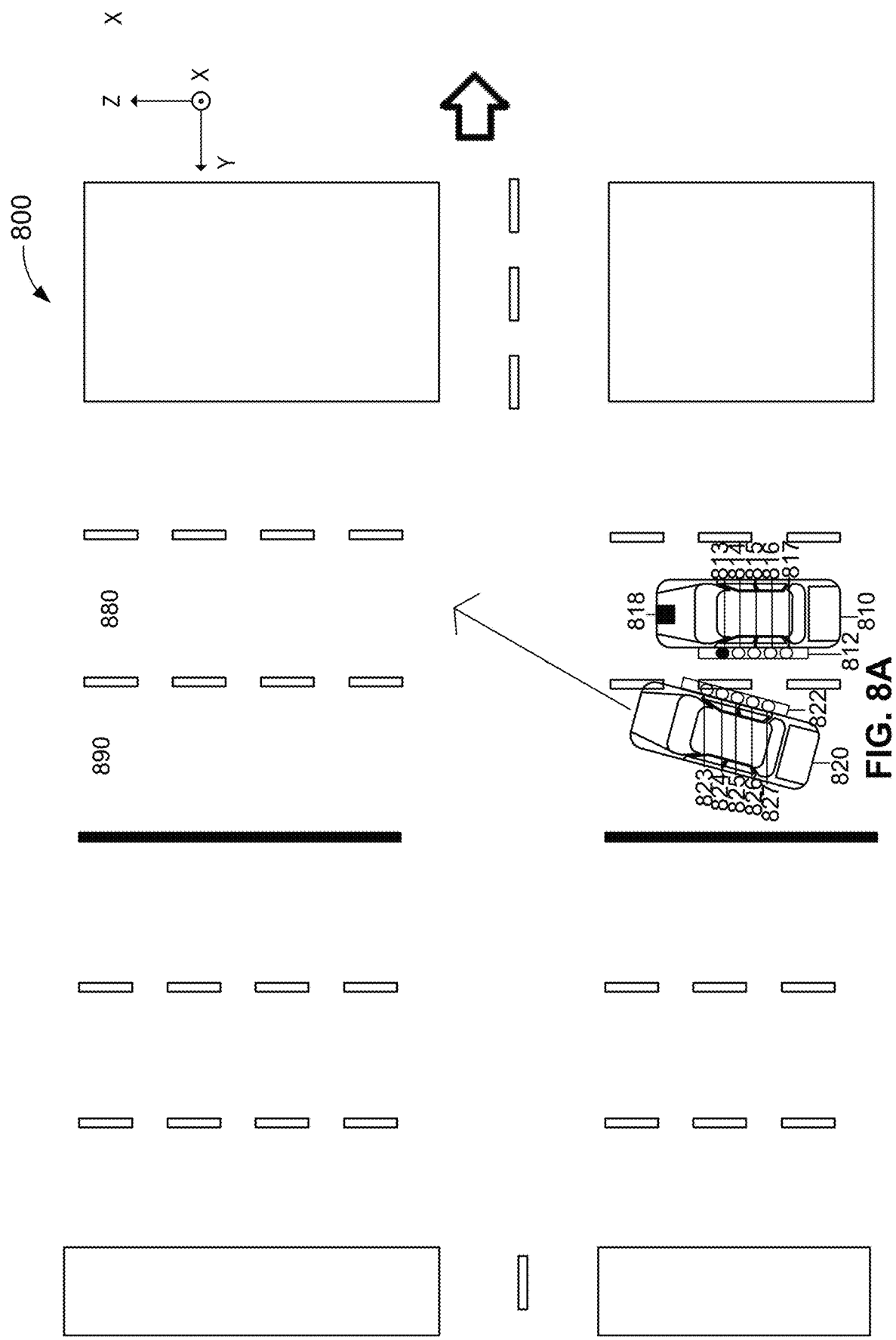

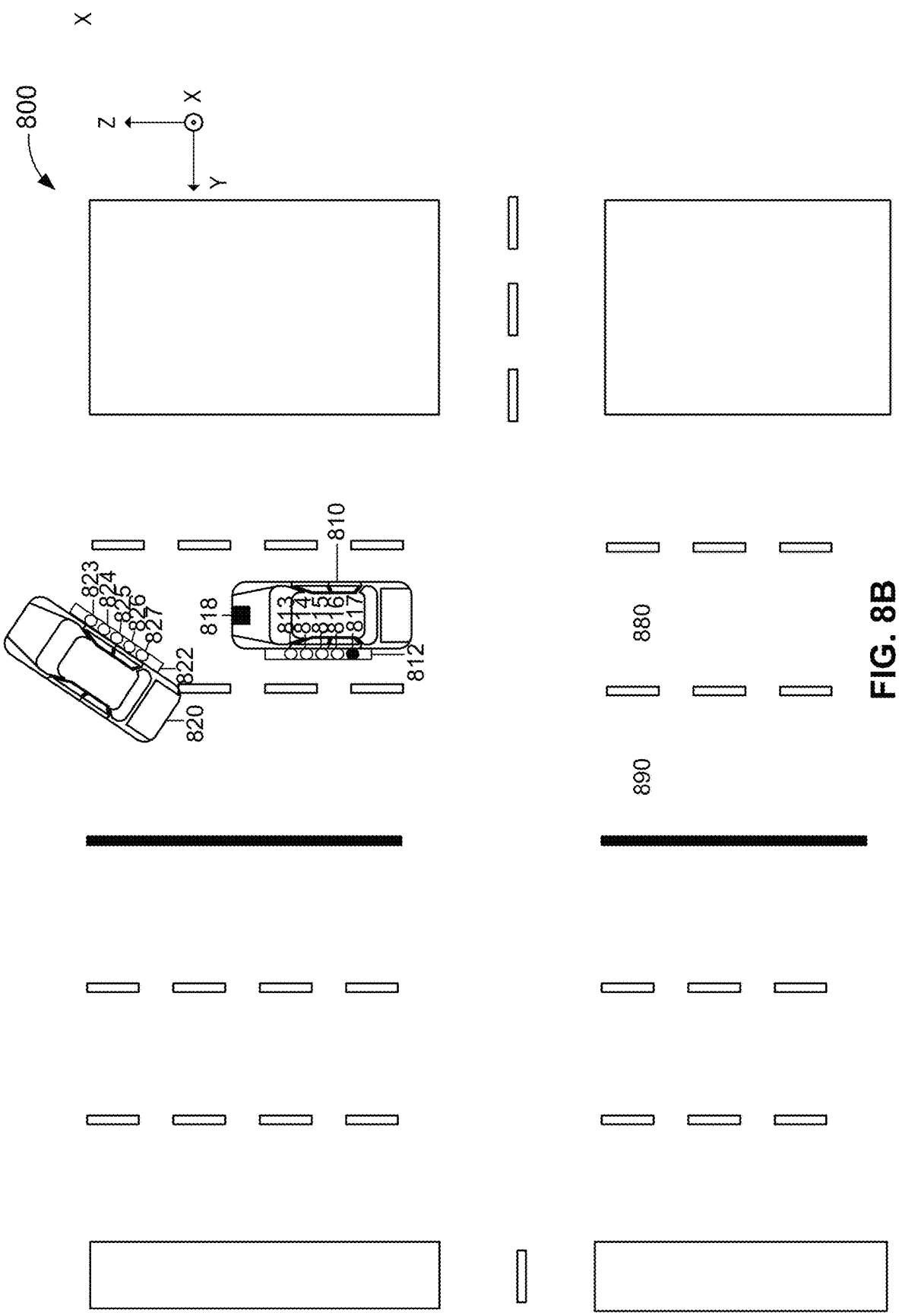

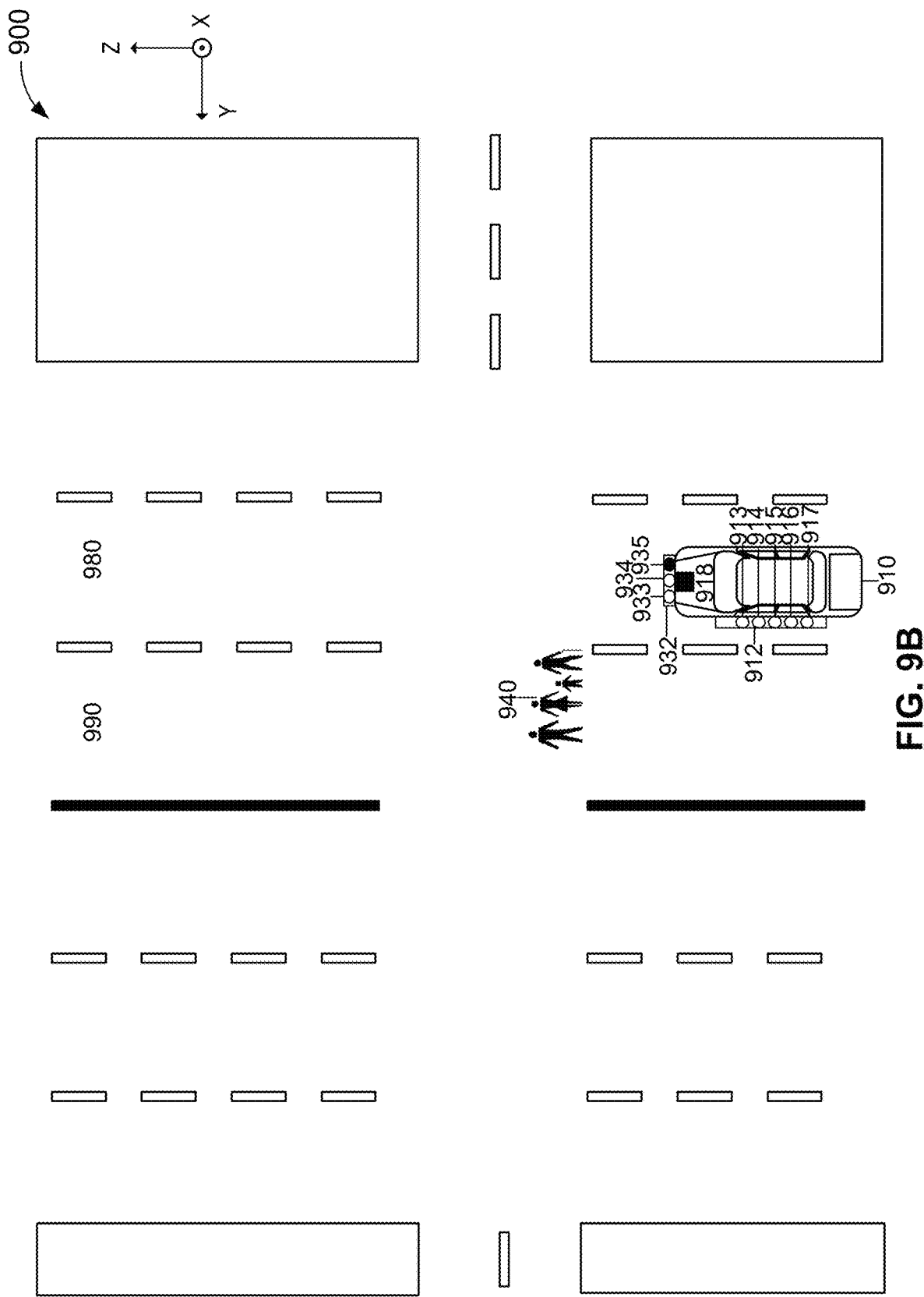

REAL-TIME AND DYNAMIC LOCALIZATION USING ACTIVE DOPPLER SENSING SYSTEMS FOR VEHICLES

CROSS-REFERENCE TO RELATED APPLICATIONS

This application claims the benefit of U.S. Provisional Patent Application No. 62/960,446, filed on Jan. 13, 2020, the contents of which are incorporated herein by reference in their entirety.

TECHNICAL FIELD

The present disclosure relates generally to vehicles such as autonomous vehicles (AVs) that obtain calibration parameters from active Doppler sensors such as optical radar, radar, and sonar sensors, and use calibration parameters to compare with results from other sensors and to determine a location of the vehicles.

BACKGROUND

Currently, a vehicle such as an autonomous vehicle may use GPS, IMU, or an encoder such as a wheel encoder to determine a location or an orientation of the vehicle. However, current techniques to determine the location or the orientation of the vehicle may not be checked or verified by another source. Additionally, current techniques such as GPS may be unavailable in certain locations such as tunnels. Moreover, techniques such as an encoder may not be sufficiently accurate. These shortfalls are addressed by the present disclosures, which provide an efficient and effective system and method of determining a location and/or an orientation of a vehicle using one or more active Doppler sensors while the vehicle is driving on the road.

SUMMARY

Various embodiments of the present disclosure provide a system on a vehicle comprising: an active Doppler sensor; one or more processors; and a memory storing instructions that, when executed by the one or more processors, causes the system to perform: obtaining a Doppler signature from each of one or more entities, for example, when the vehicle is driving; and determining one or more calibration parameters of the active Doppler sensor based on the Doppler signature from at least a portion of the one or more entities.

In some embodiments, the determining the one or more calibration parameters further comprises: determining a mounting location, a mounting offset angle, a linear ego-velocity, and a rotational velocity of the active Doppler sensor.

In some embodiments, the instructions further cause the system to perform: determining a location of the vehicle based on one or more of the calibration parameters.

In some embodiments, the determining the location of the vehicle comprises determining the location of the vehicle by integrating the determined linear ego-velocity over time or the determined rotational velocity over time.

In some embodiments, the instructions further cause the system to perform: comparing the determined location with a location obtained from a GPS or an IMU.

In some embodiments, the determining the one or more calibration parameters further comprises: individually determining whether each of the one or more entities is stationary; removing any of the entities determined not to be stationary; and determining the one or more calibration parameters based on one or more of the entities determined to be stationary, and wherein: the one or more entities comprise another vehicle, a road sign, a curb, or a tree.

In some embodiments, the Doppler signature from each of the one or more entities comprises a Doppler velocity; and the determining the one or more calibration parameters further comprises: forming one or more clusters, each of the clusters comprising at least a portion of the entities determined to be stationary and defining a relationship between a location of one of the entities with respect to the active Doppler sensor and the Doppler velocity of the respective one of the entities; fitting, to each of the one or more clusters, a signal model defining the Doppler velocity in relation to a mounting offset angle of the active Doppler sensor, and a mounting location of the active Doppler sensor; determining a degree of fit of the signal model to each of the one or more clusters; and removing any of the clusters having a degree of fit lower than a threshold while keeping remaining clusters.

In some embodiments, the signal model is defined by $V_D = V_L \cos(\Theta+\beta) + V_R \sin(\Theta+\beta-\gamma)$. In some embodiments, the calibration parameters comprise $V_L$, $V_R$, $\beta$, and $\gamma$. $V_D$ is the Doppler velocity of the one of the entities; $V_L$ is a linear ego-velocity component of the one of the entities in a forward direction of the vehicle; $V_R$ is a rotational velocity component of the one of the entities; $\Theta$ is an angle defining the location of the one of the entities with respect to the active Doppler sensor; $\beta$ is the mounting offset angle of the active Doppler sensor; and $\gamma$ is defined as $\gamma = \beta - \arctan(y/x)$, wherein y and x define the mounting location of the active Doppler sensor with respect to an ego coordinate system of the vehicle.

In some embodiments, the determining the one or more calibration parameters further comprises: determining, for each of the remaining clusters, a difference between the linear ego-velocity component and a linear ego-velocity obtained from a GPS or an IMU and a second difference between the rotational velocity component and a rotational velocity obtained from the GPS or the IMU; removing any of the remaining clusters in which the difference is lower than a second threshold or the second difference is lower than a third threshold; combining the unremoved clusters; refitting the signal model to the combined clusters; and determining $V_L$, $V_R$, $\beta$, and $\gamma$.

In some embodiments, the determining the one or more calibration parameters further comprises: obtaining a Doppler signature, for a plurality of frames, from the each of one or more entities while the vehicle is driving; and determining the one or more calibration parameters based on the Doppler signature from at least a portion of the one or more entities, for the plurality of frames.

In some embodiments, the determining the one or more calibration parameters further comprises: obtaining values of $V_L$, $V_R$, $\beta$, and $\gamma$ for each of the plurality of frames; comparing the values of $V_L$, $V_R$, $\beta$, and $\gamma$, for each of the respective one or more entities, between each of the plurality of frames; determining whether any of the values of $V_L$, $V_R$, $\beta$, and $\gamma$ of any of the plurality of frames differs from a mean value or a median value of any of $V_L$, $V_R$, $\beta$, and $\gamma$ across the plurality of frames by more than a fourth threshold; removing any of the frames that differ from the mean value or the median value by more than the fourth threshold; and determining the one or more calibration parameters based on the unremoved frames.

Various embodiments of the present disclosure provide a method implemented by a system including an active Doppler sensor, one or more processors and storage media storing machine-readable instructions. The method may comprise obtaining a Doppler signature from each of one or more entities, for example, when the vehicle is driving; and determining one or more calibration parameters of the active Doppler sensor based on the Doppler signature from at least a portion of the one or more entities.

In some embodiments, the determining the one or more calibration parameters further comprises: determining a mounting location, a mounting offset angle, a linear ego-velocity, and a rotational velocity of the active Doppler sensor.

In some embodiments, the method further comprises determining a location of the vehicle based on one or more of the calibration parameters.

In some embodiments, the determining the location of the vehicle comprises determining the location of the vehicle by integrating the determined linear ego-velocity over time or the determined rotational velocity over time.

In some embodiments, the method further comprises comparing the determined location with a location obtained from a GPS or an IMU.

In some embodiments, the determining the one or more calibration parameters further comprises: individually determining whether each of the one or more entities is stationary; removing any of the entities determined not to be stationary; and determining the one or more calibration parameters based on one or more of the entities determined to be stationary, and wherein: the one or more entities comprise another vehicle, a road sign, a curb, or a tree.

In some embodiments, the Doppler signature from each of the one or more entities comprises a Doppler velocity; and the determining the one or more calibration parameters further comprises: forming one or more clusters, each of the clusters comprising at least a portion of the entities determined to be stationary and defining a relationship between a location of one of the entities with respect to the active Doppler sensor and the Doppler velocity of the respective one of the entities; fitting, to each of the one or more clusters, a signal model defining the Doppler velocity in relation to a mounting offset angle of the active Doppler sensor, and a mounting location of the active Doppler sensor; determining a degree of fit of the signal model to each of the one or more clusters; and removing any of the clusters having a degree of fit lower than a threshold while keeping remaining clusters.

In some embodiments, the signal model is defined by $V_D = V_L \cos(\Theta+\beta) + V_R \sin(\Theta+\beta-\gamma)$, and wherein: the calibration parameters comprise $V_L$, $V_R$, $\beta$, and $\gamma$; $V_D$ is the Doppler velocity of the one of the entities; $V_L$ is a linear ego-velocity component of the one of the entities in a forward direction of the vehicle; $V_R$ is a rotational velocity component of the one of the entities; $\Theta$ is an angle defining the location of the one of the entities with respect to the active Doppler sensor; $\beta$ is the mounting offset angle of the active Doppler sensor; and $\gamma$ is defined as $\gamma = \beta - \arctan(y/x)$, wherein y and x define the mounting location of the active Doppler sensor with respect to an ego coordinate system of the vehicle.

In some embodiments, the determining the one or more calibration parameters further comprises: determining, for each of the remaining clusters, a difference between the linear ego-velocity component and a linear ego-velocity obtained from a GPS or an IMU and a second difference between the rotational velocity component and a rotational velocity obtained from the GPS or the IMU; removing any of the remaining clusters in which the difference is lower than a second threshold or the second difference is lower than a third threshold; combining the unremoved clusters; refitting the signal model to the combined clusters; and determining $V_L$, $V_R$, $\beta$, and $\gamma$.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 4A-4C, 5A-5B, 6A-6B, 7A-7B, 8A-8B, 9A-9B and 10A-10B illustrate an example implementations of a computing system according to an embodiment of the present disclosure.

DETAILED DESCRIPTION

In general, a vehicle (e.g., an autonomous vehicle, a driverless vehicle, etc.) can have myriad sensors onboard the vehicle. The myriad sensors can include light detection and ranging sensors (or LiDARs), radars, cameras, GPS, sonar, ultrasonic, IMU (inertial measurement unit), accelerometers, gyroscopes, magnetometers, FIR (far infrared) sensors, etc. The myriad sensors can play a central role in functioning of an autonomous or driverless vehicle. For example, LiDARs can be utilized to detect and identify objects (e.g., other vehicles, road signs, pedestrians, buildings, etc.) in a surrounding. LiDARs can also be utilized to determine relative distances of the objects in the surrounding. For another example, radars can be utilized to aid with collision avoidance, adaptive cruise control, blind side detection, assisted parking, etc. For yet another example, a camera can be utilized to recognize, interpret, and/or analyze contents or visual cues of the objects. Cameras and other optical sensors can capture image data using charge coupled devices (CCDs), complementary metal oxide semiconductors (CMOS), or similar elements. An IMU may detect abnormal occurrences such as a bump or pothole in a road. Data collected from these sensors can then be processed and used, as inputs, to make driving decisions (e.g., acceleration, deceleration, direction change, etc.). For example, data from these sensors may be further processed into an image histogram of a graphical representation of tonal distribution in an image captured by the one or more sensors.

Various embodiments overcome problems specifically arising in the realm of autonomous vehicle technology. Sensors on a vehicle may assist in finding a stop point (parking spot, drop off or pick up point). In various embodiments, the myriad sensors (e.g., LiDARs, radars, cameras, etc.) onboard the autonomous vehicle can be encased or housed in an enclosure. The enclosure allows the myriad sensors to be moved from one vehicle to another vehicle in a single act, rather than to move the myriad sensors one by one. In some embodiments, the enclosure can be installed or mounted onto a fixture of the autonomous vehicle. For example, the enclosure can be installed or mounted onto a roof rack or a custom rack fitted to the autonomous vehicle. The enclosure can be translated or moved along the fixture. In some embodiments, the enclosure is made of a material that is transparent to electromagnetic waves receptive to the myriad sensors encased by the enclosure. For example, the enclosure can be made from a transparent material that allows laser lights, radio waves, and visible lights emitted and/or received by the LiDARs, the radars, and the cameras, respectively, to enter and/or exit the enclosure.

Figure 1:
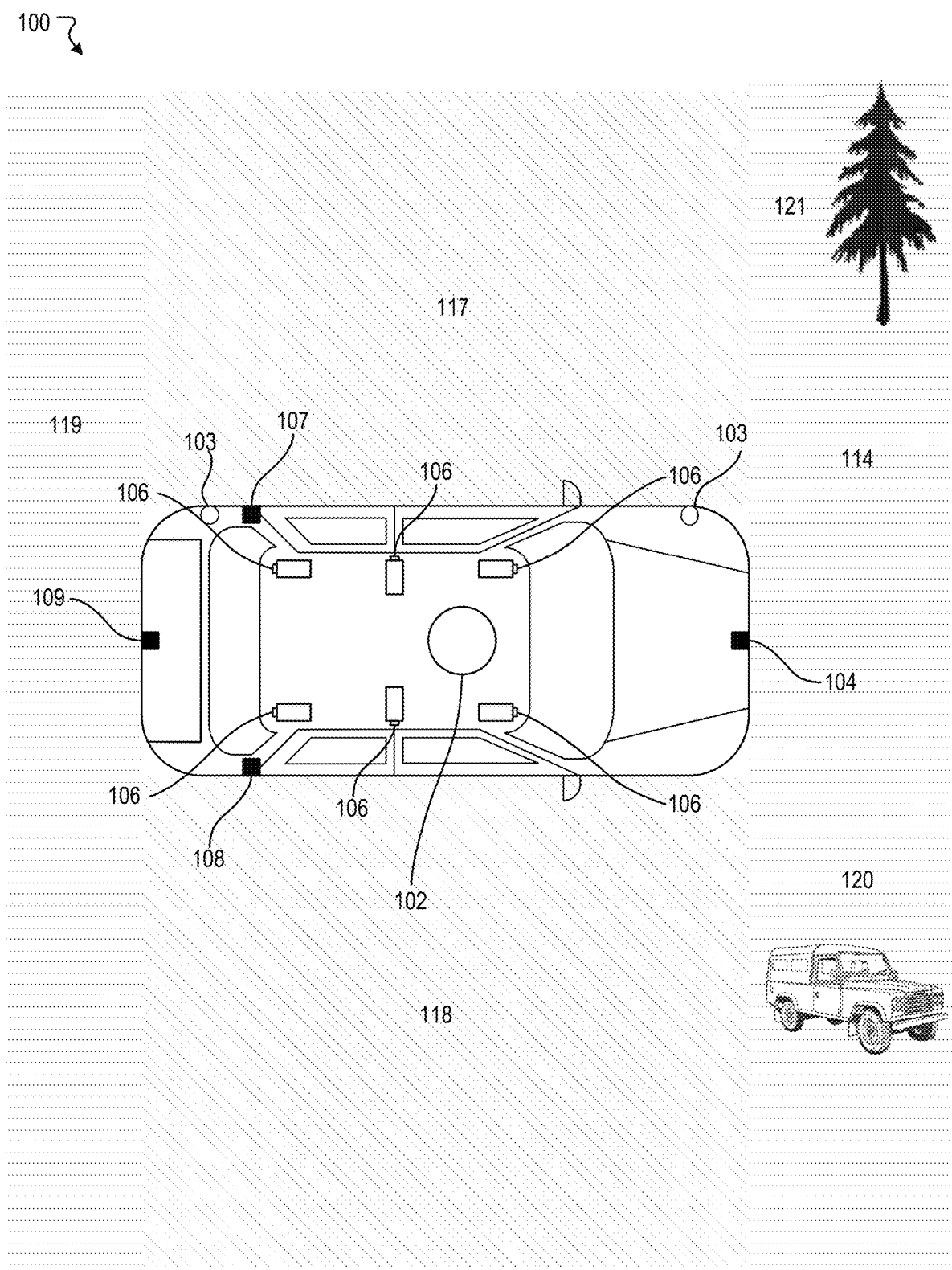
FIG. 1 illustrates an example vehicle, such as an autonomous vehicle (AV), according to an embodiment of the present disclosure.

FIG. 1 illustrates an example vehicle 100 such as an autonomous vehicle, according to an embodiment of the present disclosure. A vehicle 100 generally refers to a category of vehicles that are capable of sensing and driving in a surrounding by itself. The vehicle 100 can include myriad sensors (e.g., LiDARs, radars, cameras, etc.) to detect and identify objects in the surrounding. Such objects may include, but not limited to, pedestrians, road signs, traffic lights, and/or other vehicles, for example. The vehicle 100 can also include myriad actuators to propel and navigate the vehicle 100 in the surrounding. Such actuators may include, for example, any suitable electro-mechanical devices or systems to control a throttle response, a braking action, a steering action, etc. In some embodiments, the vehicle 100 can recognize, interpret, and analyze road signs (e.g., speed limit, school zone, construction zone, etc.) and traffic lights (e.g., red light, yellow light, green light, flashing red light, etc.). For example, the vehicle 100 can adjust vehicle speed based on speed limit signs posted on roadways. In some embodiments, the vehicle 100 can determine and adjust speed at which the vehicle 100 is traveling in relation to other objects in the surroundings. For example, the vehicle 100 can maintain a constant, safe distance from a vehicle ahead (e.g., adaptive cruise control). In this example, the vehicle 100 maintains this safe distance by constantly adjusting its vehicle speed to that of the vehicle ahead.

In various embodiments, the vehicle 100 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 100 can effectuate any control to itself that a human driver can on a conventional vehicle. For example, the vehicle 100 can accelerate, brake, turn left or right, or drive in a reverse direction just as a human driver can on the conventional vehicle. The vehicle 100 can also sense environmental conditions, gauge spatial relationships (e.g., distances between objects and itself), detect and analyze road signs just as the human driver. Moreover, the vehicle 100 can perform more complex operations, such as parallel parking, parking in a crowded parking lot, collision avoidance, etc., without any human input.

In various embodiments, the vehicle 100 may include one or more sensors. As used herein, the one or more sensors may include laser scanning systems (e.g., LiDARs) 102, ultrasonic sensors 103, active Doppler sensor systems such as radar, coherent detection lidar, and sonar sensors represented by 104, 107, 108, and 109, camera systems 106, GPS, sonar, IMU (inertial measurement unit), accelerometers, gyroscopes, magnetometers, FIR (far infrared) sensors, and/or the like. The one or more sensors allow the vehicle 100 to sense an environment around the vehicle 100. For example, the LiDARs 102 can generate a three-dimensional map of the environment. The LiDARs 102 can also detect objects in the environment. In the example of FIG. 1, the vehicle 100 is shown with the four active Doppler sensor systems 104, 107, 108, and 109. Two active Doppler sensor systems 104 and 109 are coupled to a front-side and a back-side of the vehicle 100, respectively, and two active Doppler sensor systems 108 and 107 are coupled to a right-side and a left-side of the vehicle 100, respectively. In some embodiments, the front-side and the back-side active Doppler sensor systems 104 and 109 can be configured for adaptive cruise control and/or accident avoidance. For example, the front-side active Doppler sensor system 104 can be used by the vehicle 100 to maintain an acceptable distance from a vehicle ahead of the vehicle 100. In another example, if the vehicle ahead experiences a sudden reduction in speed, the vehicle 100 can detect this sudden change in motion and adjust its vehicle speed accordingly. In some embodiments, the right-side and the left-side active Doppler sensor systems 108 and 107 can be configured for blind-spot detection. In some embodiments, the front-side active Doppler sensor system 104 may be configured to detect entities or objects in a region 114 in front of the vehicle 100, such as a tree 121 and another vehicle 120. In some embodiments, the back-side active Doppler sensor system 109 may be configured to detect entities or objects in a region 119 behind the vehicle 100. In some embodiments, the right-side active Doppler sensor system 108 may be configured to detect entities or objects in a region 118 to a right of the vehicle 100. In some embodiments, the left-side active Doppler sensor system 107 may be configured to detect entities or objects in a region 117 to a left of the vehicle 100. In some embodiments, each of the active Doppler sensor systems 104, 107, 108, and 109 may have a 180-degree field-of-view.

In the example of FIG. 1, the vehicle 100 is shown with six camera systems 106 on a roof of the vehicle 100. Two camera systems are coupled to the front-side of the roof of the vehicle 100, two camera systems are coupled to the back-side of the roof of the vehicle 100, and two camera systems are coupled to the right-side and the left-side of the roof of the vehicle 100. In some embodiments, the front-side and the back-side camera systems can be configured to detect, identify, and decipher objects, such as cars, pedestrian, road signs, in the front and the back of the vehicle 100. For example, the front-side camera systems can be utilized by the vehicle 100 to determine speed limits. In some embodiments, the right-side and the left-side camera systems can be configured to detect objects, such as lane markers. For example, side camera systems can be used by the vehicle 100 to ensure that the vehicle 100 drives within its lane.

Figure 2:
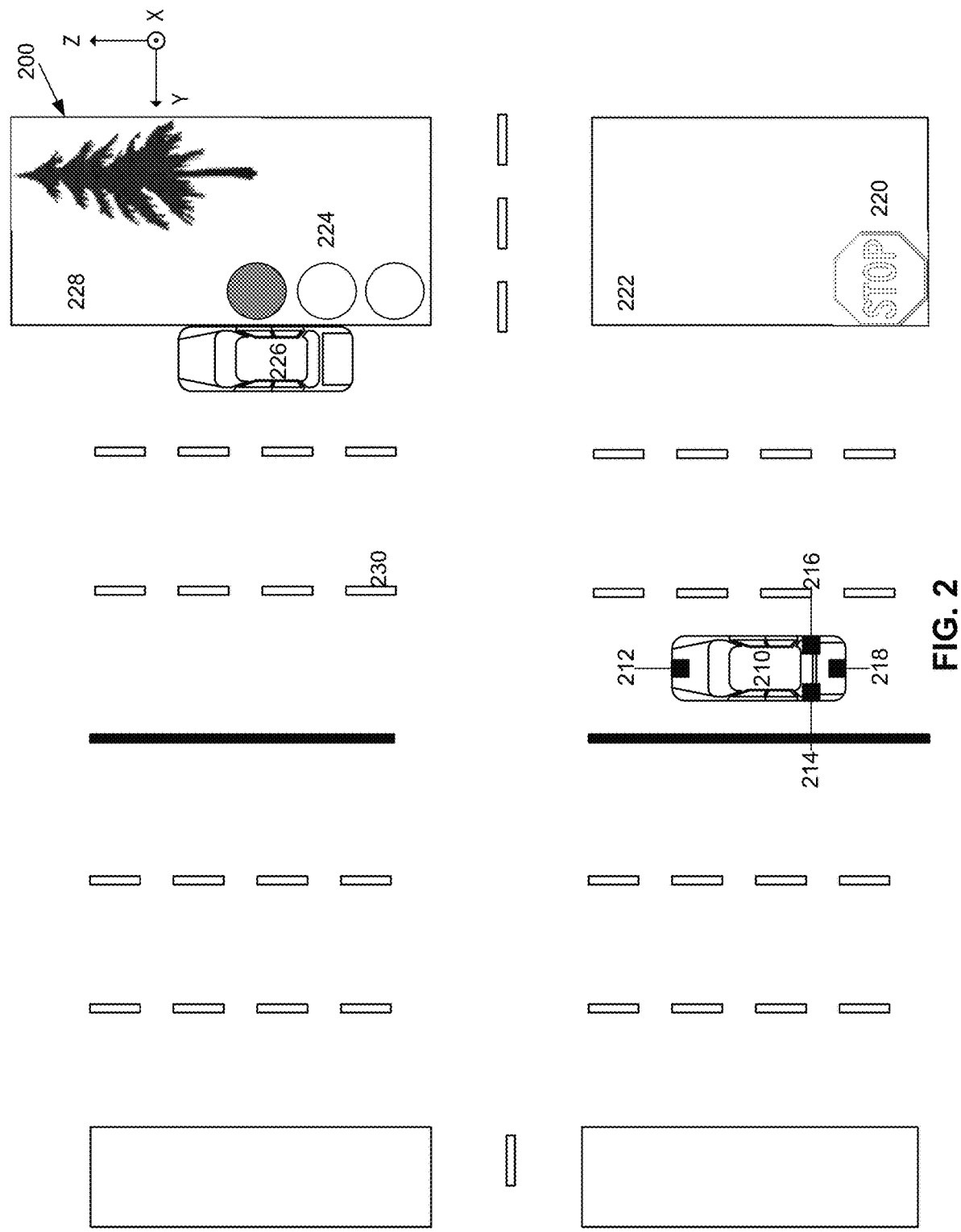
FIG. 2 illustrates an example implementation of a vehicle according to an embodiment of the present disclosure.

FIG. 2 illustrates an example implementation of a vehicle according to an embodiment of the present disclosure. In some embodiments, a vehicle 210 driving on a road 200 may be implemented as the vehicle 100. In some embodiments, the vehicle 210 may comprise active Doppler sensor systems 212, 214, 216, and 218. In some embodiments, one or more of the active Doppler sensor systems 212, 214, 216, and 218 may be configured to detect and obtain a Doppler signature from entities or objects such as a stop sign 220, a curb or sidewalk 222, traffic lights 224, another vehicle 226 such as a stationary vehicle, a tree 228, and/or a lane divider 230. In some embodiments, a back-side active Doppler sensor system 218 and/or a right-side active Doppler sensor system 216 may detect the stop sign 220. In some embodiments, the back-side active Doppler sensor system 218, the right-side active Doppler sensor system 216, and/or a front-side active Doppler sensor system 212 may detect the curb or the sidewalk 222. In some embodiments, the right-side active Doppler sensor system 216, and/or the front-side active Doppler sensor system 212 may detect the traffic lights 224, the another vehicle 226, the tree 228, and/or the lane divider 230. The active Doppler sensor systems 212, 214, 216, and 218 may initially capture a single frame, and as the vehicle 210 drives forward, the active Doppler sensor systems 212, 214, 216, and 218 may capture additional frames.

Figure 3:
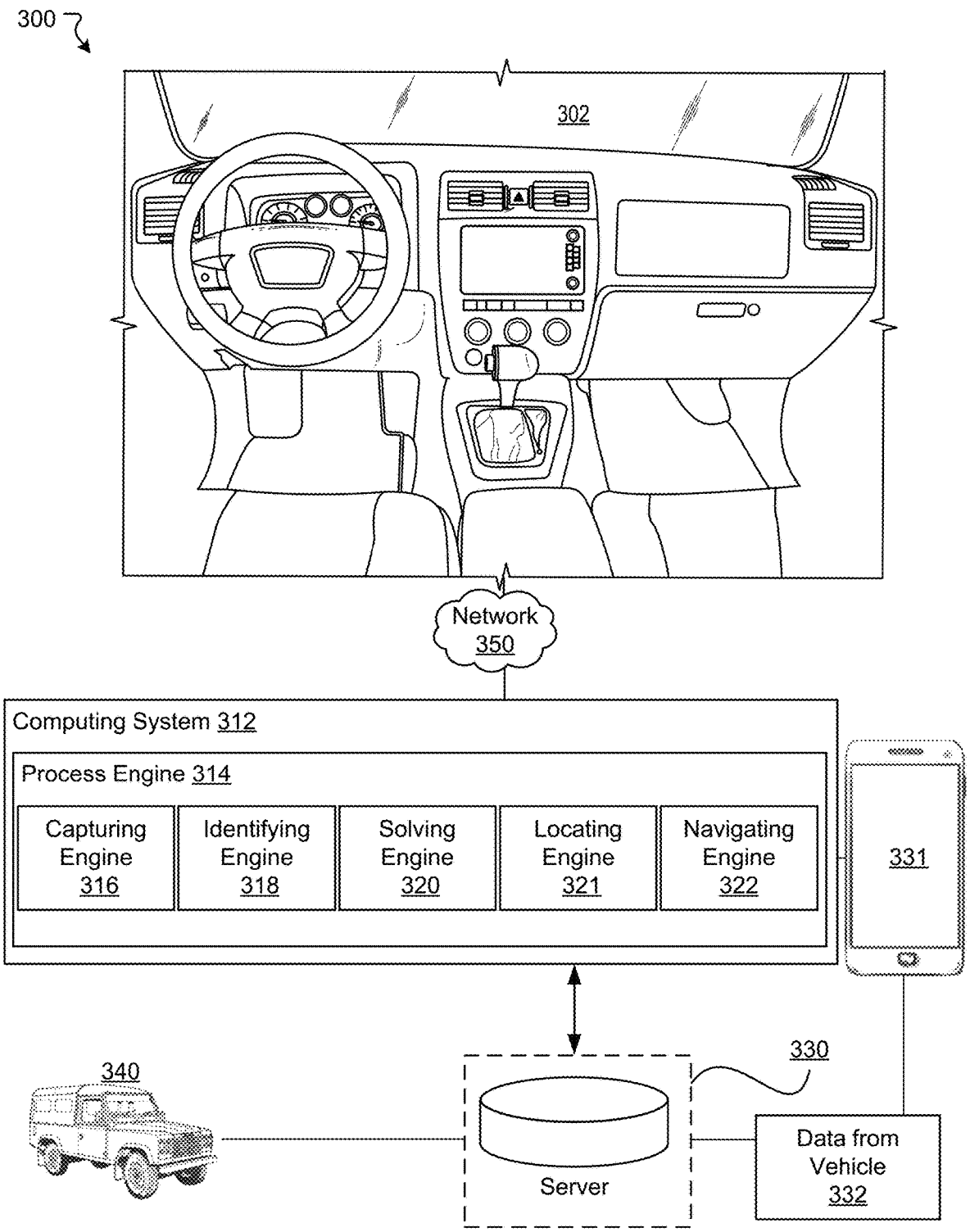
FIG. 3 illustrates an example environment of a system that obtains a Doppler signature, determines one or more calibration parameters based on the Doppler signature, and determines a location and/or orientation based on the calibration parameters, and navigates based on the determined location and/or orientation, according to an embodiment of the present disclosure.

FIG. 3 illustrates an example environment of a system that obtains a Doppler signature, determines one or more calibration parameters based on the Doppler signature, and determines a location and/or orientation based on the calibration parameters, and navigates based on the determined location and/or orientation, according to an embodiment of the present disclosure. In various embodiments, a vehicle 302 may be implemented as the vehicle 100 or the vehicle 210. The vehicle 302 may utilize its sensors including LiDAR, active Doppler sensors, camera, GPS, and/or ultrasonic sensors, as described with respect to the vehicle 100, to obtain data and to determine one or more driving actions. The vehicle 302 may be connected, over a network 350, to at least one computing system 312 that includes one or more processors and memory, and to a device 331. In some embodiments, the at least one computing system 312 may be physically and/or electrically connected to the vehicle 302. In some embodiments, the computing system 312 may be integrated as part of the vehicle 302. One or more users may, through the device 331, request, view, and/or access details of the calibration parameters of the active Doppler sensors and/or adjust settings of the calibration parameters of the active Doppler sensors. The processors may be configured to perform various operations by interpreting machine-readable instructions. In some embodiments, the example environment 300 may be implemented as a data platform. In some embodiments, the example environment 300 may be configured to interact with computing systems of the data platform. In various embodiments, one or more computing systems 312 of the data platform may coordinate and/or control one or more operations of determining the calibration parameters of the active Doppler sensors of the vehicle 302.

In some embodiments, the computing system 312 may include a process engine 314. The process engine 314 may include a capturing engine 316, an identifying engine 318, a solving engine 320, a locating engine 321, and a navigating engine 322. The process engine 314 may be executed by the processor(s) of the computing system 312 to perform various operations including those operations described in reference to the capturing engine 316, the identifying engine 318, the solving engine 320, the locating engine 321, and the navigating engine 322. In general, the process engine 314 may be implemented, in whole or in part, as software that is capable of running on one or more computing devices or systems. In one example, the process engine 314 may be implemented as or within a software application running on one or more computing devices (e.g., user or client devices) and/or one or more servers (e.g., network servers or cloud servers, servers 330). In some instances, various aspects of the capturing engine 316, the identifying engine 318, the solving engine 320, the locating engine 321, and the navigating engine 322 may be implemented in one or more computing systems and/or devices. In some instances, one or more of the capturing engine 316, the identifying engine 318, the solving engine 320, the locating engine 321, and the navigating engine 322 may be combined or integrated into a single processor, and some or all functions performed by one or more of the capturing engine 316, the identifying engine 318, the solving engine 320, the locating engine 321, and the navigating engine 322 may not be spatially separated, but instead may be performed by a common processor. The environment 300 may also include the one or more servers 330 accessible to the computing system 312. The one or more servers 330 may store information of whether each entity or object, such as the stop sign 220, the curb or the sidewalk 222, the traffic lights 224, the another vehicle 226, the tree 228, and/or the lane divider 230, from FIG. 2, is stationary. In some embodiments, the one or more servers 330 may further store data regarding whether a particular type of entity or object is stationary. For example, the one or more servers 330 may store data indicating that road signs such as stop signs and traffic lights, road markings such as lane dividers and median strips are stationary, artifacts such as tunnels, curbs, or sidewalks, and plants such as trees, are stationary. The computing system 312 may identify whether an object or entity is stationary by determining a type of the object or entity.

In some embodiments, the one or more servers 330 may integrate data from different sensors. In other embodiments, the one or more servers 330 may keep the data from the different sensors separate. The one or more servers 330 may be accessible to the computing system 312 either directly or over the network 350. In some embodiments, the one or more servers 330 may store data that may be accessed by the process engine 314 to provide the various features described herein. In some embodiments, the one or more servers 330 may store data of concentrations of chemicals at specific times in the interior of the vehicle 302. In some instances, the one or more servers 330 may include federated data stores, databases, or any other type of data source from which data may be stored and retrieved, for example. In some implementations, the one or more servers 330 may include various types of data sets on which determinations of accuracy or consistency with other information can be made. In general, a user operating a computing device can interact with the computing system 312 over the network 350, for example, through one or more graphical user interfaces and/or application programming interfaces. The one or more servers 330 may store data 332 from the vehicle 302 and exchange the data 332 with another vehicle 340. The one or more servers 330 may store data from the another vehicle 340 and exchange the data from the another vehicle 340 with the vehicle 302.

The capturing engine 316 may comprise one or more sensors such as one or more active Doppler sensors, for example, the active Doppler sensors 212, 214, 216, and 218. The capturing engine 316 may be configured to obtain and/or extract data of objects and entities, such as the stop sign 220, the curb or the sidewalk 222, the traffic lights 224, the another vehicle 226, the tree 228, and/or the lane divider 230, from FIG. 2. The obtained data may further comprise timestamp data indicating a time of capture of the data. The identifying engine 318 may identify or determine whether each of the entities or objects obtained by the capturing engine 316 is stationary. The capturing engine 316 may be configured to capture a plurality of frames. Each of the plurality of frames may be used one by one, for example, by the solving engine 320, to obtain a Doppler signature and determine one or more calibration parameters based on the Doppler signature. The identifying engine 318 may identify whether each of the entities or objects is stationary by determining a type of each of the entities or objects and using information from the server 330 of whether the type of the entity or the object is stationary. The identifying engine 318 may identify or determine whether each of the entities or objects is stationary based on one or more algorithms. The identifying engine 318 may identify or determine whether each of the entities or objects is stationary by determining a velocity of each of the entities or objects such as the stop sign 220, the curb or the sidewalk 222, the traffic lights 224, the another vehicle 226, the tree 228, and/or the lane divider 230, from FIG. 2, and subtracting a velocity of the vehicle 302 from the determined velocity of the respective entity or object.

The solving engine 320 may be configured to obtain a Doppler signature from each of the entities or objects, for example, while the vehicle 302 is driving. The solving engine 320 may obtain the Doppler signature from each of the entities or objects determined to be stationary by the identifying engine 318, without obtaining the Doppler signature from objects or entities determined not to be stationary. The solving engine 320 may obtain the Doppler signature using fusion of multiple active Doppler sensors of the vehicle 302. The Doppler signature may comprise a Doppler velocity at a particular location of an entity or object with respect to an active Doppler sensor. The particular location may be denoted by an angle, such as an angle between a direction of travel of the vehicle 302 and a path from the active Doppler sensor to the entity or object. In some embodiments, the solving engine 320 may be configured to determine the Doppler velocity by determining a Doppler shift at each entity or object as a result of the vehicle 302 driving towards or away from that entity or object. In some embodiments, the solving engine 320 may be configured to form one or more clusters. Each of the clusters may comprise at least some of the entities or objects determined to be stationary. Each of the clusters may comprise points. Each point may define or describe a relationship between a location of an entity or object with respect to the active Doppler sensor and the Doppler velocity of the respective entity or object. In some embodiments, each of the clusters may comprise at least three distinct points. In some embodiments, each of the clusters may comprise data of entities or objects at specific geographic coordinates and/or taken at specific time intervals, and different clusters may be organized based on geographic coordinates of the entities or objects and/or time intervals at which the data is obtained. For example, one cluster may be limited to, or comprise, data points of entities or objects in front of the vehicle 302 and another cluster may be limited to, or comprise, data points of entities or objects behind the vehicle 302. As another example, one cluster may be limited to, or comprise, data points of entities or objects taken in a particular 5-minute interval, and another cluster may be limited to, or comprise, data points of entities or objects taken in a next 5-minute interval. As another example, one cluster may comprise different data points of a same entity or object, such as a vehicle, a tree, a curb, a road signal, or a traffic signal. The solving engine 320 may be configured to fit, to each of the clusters, a signal model defining the Doppler velocity in relation to an azimuth offset angle or a mounting offset angle of the active Doppler sensor and a mounting location of the active Doppler sensor. In some embodiments, the signal model may be defined by $V_D = V_L \cos(\Theta + \beta) + V_R \sin(\Theta + \beta - \gamma)$, wherein: $V_D$ is the Doppler velocity of the object or entity relative to the vehicle 302; $V_L$ is a linear ego-velocity component in a direction of a x-axis, which points forward from the vehicle 302; $V_R$ is a rotational velocity component of the object or entity relative to the vehicle 302; $\Theta$ is an angle defining the location of the object or entity with respect to the active Doppler sensor; $\beta$ is the azimuth offset angle or the mounting offset angle between a normal axis of the active Doppler sensor and the x-axis; and $\gamma$ is the mounting angle of the active Doppler sensor. In some embodiments, $\gamma$ may be defined as $\gamma = \beta - \arctan(y/x)$, wherein y and x define a mounting location of the active Doppler sensor with respect to an ego coordinate system of the vehicle. If the object or entity is stationary, $V_L$ may be a linear ego-velocity component of the vehicle 302 in the direction of the x-axis and $V_R$ may be a rotational velocity component of the vehicle 302.

In other embodiments, the solving engine 320 may first determine or estimate a value of $\beta$ by using $V_{D0} = V_L \cos(\Theta + \beta)$, and taking a known value of $V_L$ from a GPS or IMU measurement. In some embodiments, $V_{D0}$ may be a Doppler velocity assuming no rotational velocity of the object or entity. With $V_L$, $V_{D0}$ and $\Theta$ being known or measured values, the solving engine 320 may determine or estimate the value of $\beta$. The solving engine 320 may then determine or estimate a value of $\gamma$.

The solving engine 320 may determine a degree of fit of the signal model, for example, $V_D = V_L \cos(\Theta + \beta) + V_R \sin(\Theta + \beta - \gamma)$ to each of the clusters. If the solving engine 320 determines that the degree of fit of the signal model to a cluster is lower than a threshold degree of fit, the solving engine 320 may disregard, discard or remove the cluster so that the cluster is not used to obtain calibration parameters of the active Doppler sensor. If the solving engine 320 determines that the degree of fit of the signal model to a cluster is higher than or equal to a threshold degree of fit, the solving engine 320 may keep the cluster so that the cluster is retained to be used to obtain calibration parameters of the active Doppler sensor. The solving engine 320 may determine values of the calibration parameters $V_L$, $V_R$, $\beta$, and $\gamma$.

The solving engine 320 may be configured to further compare, for each of the retained clusters, the determined values of $V_L$ and/or $V_R$ with values of a linear ego-velocity and/or a rotational velocity obtained from a GPS or an IMU, if such values exist. For a given cluster, if the determined value of $V_L$ differs from the value of the linear ego-velocity by more than a threshold value, and/or the determined value of $V_R$ differs from the value of the rotational velocity by more than a threshold value, the solving engine 320 may remove that cluster. The solving engine 320 may combine the unremoved clusters and refit the signal model to the combined clusters to determine updated values of $V_L$, $V_R$, $\beta$, and $\gamma$. The updated values may be saved, for example, to the one or more servers 330.

The process described above for the solving engine 320 so far determines values of $V_L$, $V_R$, $\beta$, and $\gamma$ for a single frame. As mentioned above, the capturing engine 316 may capture a plurality of frames. The solving engine 320 may repeat the process described above to determine values of $V_L$, $V_R$, $\beta$, and $\gamma$ for each of the other subsequent frames, including obtaining a Doppler signature, determining stationary entities or objects, forming clusters, fitting, for each of the clusters, the signal model, removing any of the clusters having a degree of fit lower than a threshold degree of fitting, further removing clusters in which determined values of $V_L$, $V_R$, $\beta$, and $\gamma$ differ from values obtained by the GPS or the IMU by more than threshold values. In some embodiments, the solving engine 320 may determine if the determined values of $V_L$, $V_R$, $\beta$, and $\gamma$ obtained over the plurality of frames converge. In some embodiments, the solving engine 320 may determine a mean value or a median value of $V_L$, $V_R$, $\beta$, and $\gamma$ across the plurality of frames. In some embodiments, the solving engine 320 may compare the values of $V_L$, $V_R$, $\beta$, and $\gamma$ obtained in each frame to the respective mean values or the respective median values of $V_L$, $V_R$, $\beta$, and $\gamma$. If any of the values of $V_L$, $V_R$, $\beta$, and $\gamma$ obtained in a frame differ from the mean value or the median value of any of $V_L$, $V_R$, $\beta$, and $\gamma$ by more than a threshold value, the solving engine 320 may remove that frame so as not to be used in obtaining calibration parameters of the active Doppler sensor. For example, if the value of $V_L$ obtained from a frame differs from the mean value, as measured across all frames, of $V_L$, the solving engine 320 may remove that frame. The solving engine 320 may obtain calibration parameters of the active Doppler sensor based on the remaining frames by taking median values or mean values of $V_L$, $V_R$, $\beta$, and $\gamma$ for the remaining frames. In some embodiments, the solving engine 320 may determine a mounting location of the active Doppler sensor based on the mounting angle of the active Doppler sensor and/or the azimuth or mounting offset angle of the active Doppler sensor. The mounting location may be determined with respect to ego coordinates of the vehicle. Further details of the solving engine 320 are provided in FIGS. 4A, 4B, 4C, 5A, and 5B.

The locating engine 321 may be configured to determine a location and/or orientation of the vehicle 302 using, or based on, the calibration parameters $V_L$, and/or $V_R$. For example, by integrating $V_L$, and/or $V_R$ with respect to time, the locating engine 321 may determine a change in position and/or orientation. By adding, or including, the determined change in the position and/or orientation to an initial, or original, position and/or orientation, the locating engine 321 may determine a current location and/or orientation. The locating engine 321 may compare the determined current location and/or orientation with corresponding data from a GPS or an IMU. If a deviation between the determined current location and/or orientation with corresponding data from a GPS or an IMU exceeds respective thresholds, one or more processors of the vehicle 302 such as the locating engine 321 may trigger an alarm and attempt to reconcile the deviation. Additionally, the locating engine 321 may fuse data associated with the determined current location and/or orientation with corresponding data from a GPS or an IMU.

For example, if the determined current location and/or orientation is determined to be more accurate than corresponding data from a GPS or an IMU in certain situations such as certain routes, times of day, or other conditions, the locating engine 321 may be activated to determine the current location and/or orientation using the one or more active Doppler sensors in those conditions. In some other examples, if the GPS is not operational, for instance, when the vehicle 302 is in a tunnel, or a GPS signal is compromised, the locating engine 321 may be activated as a backup to determine the location and/or orientation of the vehicle 302.

In some embodiments, the locating engine 321 may be configured to combine or fuse data obtained from each of the distinct active Doppler sensors. In some examples, the locating engine 321 may combine the data from each of the distinct active Doppler sensors using maximal ratio combining to reduce error covariances from each of the individual active Doppler sensors. In other examples, the locating engine 321 may project all of the active Doppler sensors into a common frame and create a single frame with the combined active Doppler sensors from which to determine the location and/or orientation. In some examples, the locating engine 321 may combine or fuse the data after the solving engine 320 forms the clusters or determines the values of $V_L$, $V_R$, $\beta$, and $\gamma$. In some examples, the locating engine 321 may combine or fuse the data before any or the steps, such as forming the clusters or determining the values of $V_L$, $V_R$, $\beta$, and $\gamma$, done by the solving engine 320.

The navigating engine 322 may be configured to determine a navigation action or a driving action based on the obtaining calibration parameters of the active Doppler sensor. For example, the navigating engine 322 may be configured to process data acquired by the sensors such as the active Doppler sensors 212, 214, 216, and 218, so that the vehicle 302 would have knowledge of a present location and/or orientation of the vehicle 302, and information of surroundings of the vehicle 302, in order to navigate on a route and through traffic. For example, the navigating engine 322 may detect a signal from a source (e.g., another vehicle such as the another vehicle 340, a pedestrian, or a road sign). In some embodiments, the signal may be a flashing light, a flashing row of lights, a blinking light, or a blinking row of lights on a side of the source facing the vehicle 302. The flashing or blinking light or the flashing or blinking row of lights may indicate that the source intends to overtake the vehicle 302 and to switch into a lane occupied by the vehicle 302, at a position in front of the vehicle 302. The navigating engine 322, in some embodiments, may be configured to determine a relative position of the source with respect to the vehicle 302. For example, the navigating engine 322 may be configured to determine whether the vehicle 302 is completely in front of or completely behind the source, with respect to a travelling or driving direction of the vehicle 302. If the source is not completely in front of or completely behind the vehicle 302 (for example, if a back portion of the vehicle 302 is aligned with a front portion of a source, and the vehicle 302 and the source), the navigating engine 322 may detect a lateral movement of the source even if the source does not signal. The lateral movement may be a movement from a lane occupied by the source towards a lane occupied by the vehicle 302, in a direction perpendicular to the driving direction of the vehicle 302. In some examples, the navigating engine 322 may detect whether a distance of a lateral movement, or how much the source has decreased its lateral distance from the vehicle 302, is above a threshold. In such a manner, the navigating engine 322 may be configured to detect whether a source (e.g., the another vehicle 340) is intending to overtake the vehicle 302 and to make a lane change, even when the source does not provide a signal, which may occur when the source has broken signals (e.g., lights not working). In some embodiments, the navigating engine 322 may only detect a lateral movement of a source if the source is not completely in front of or behind the vehicle 302, or if the source is within a field of view of the vehicle 302. In some embodiments, the navigating engine 322 may further be configured to detect pedestrians or people, for example, crossing a street. The navigating engine 322 may further be configured to recognize walking movements of pedestrians or people, and to recognize hand gestures or hand signals from pedestrians such as an upraised hand to indicate that the pedestrian is intending to cross a street. The navigating engine 322 may further be configured to detect and distinguish bicycles and motorcycles from other vehicles. Further details of the navigating engine 322 are provided with respect to FIGS. 6A, 6B, 7A, 7B, 8A, 8B, 9A, 9B, 10A, and 10B.

Figure 4A:
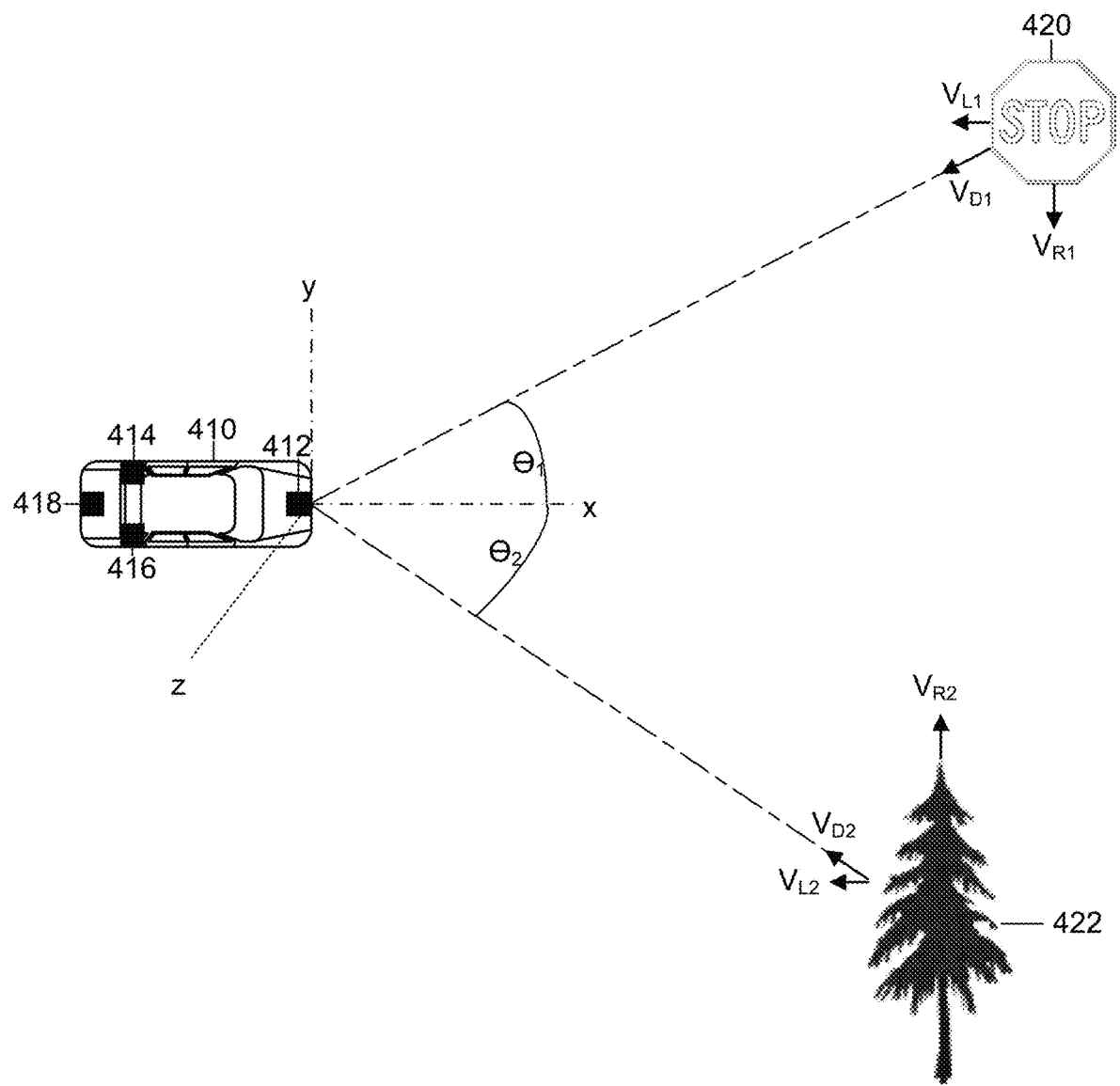

FIGS. 4A, 4B, 4C and 5A-5B illustrate example implementations of a computing system, for example, of the solving engine 320, according to an embodiment of the present disclosure. In FIG. 4A, a vehicle 410, which may be implemented as the vehicle 100, may comprise active Doppler sensors 412, 414, 416, and 418, and may be driving on a ground parallel to an x-y plane. In some embodiments, a processor associated with a front-side active Doppler sensor 412 may be configured to detect stationary entities such as a stop sign 420 and a tree 422, and to obtain a Doppler signature from the stop sign 420 and the tree 422. For example, the solving engine 320 may obtain the Doppler signature from the stop sign 420 and the tree 422 for a plurality of frames. For each frame, the solving engine 320 may determine values of $\Theta_1$ and $V_{D1}$, for the stop sign 420. In some embodiments, $\Theta_1$ may be an angle from an x-axis to a line of sight from the active Doppler sensor 412 to the stop sign 420, and may indicate a direction from the active Doppler sensor 412 to the stop sign 420. In some embodiments, $V_{D1}$ may be a Doppler velocity determined from a Doppler shift at the stop sign 420. In some embodiments, $V_{D1}$ may comprise a linear ego-velocity component $V_{L1}$ and a radial component $V_{R1}$, which may be equal to or proportional to $r_1 * \omega_1$. In some embodiments, $\omega_1$ may be a vibration rate of the stop sign 420 and $r_1$ may be a displacement distance of the stop sign 420. Similarly, the solving engine 320 may determine values of $\Theta_2$ and $V_{D2}$, for the tree 422. In some embodiments, $\Theta_2$ may be an angle from an x-axis to a line of sight from the active Doppler sensor 412 to the tree 422, and may indicate a direction from the active Doppler sensor 412 to the stop sign 422. In some embodiments, $V_{D2}$ may be a Doppler velocity determined from a Doppler shift at the tree 422. In some embodiments, $V_{D2}$ may comprise a linear ego-velocity component $V_{L2}$ and a radial component $V_{R2}$. The radial component may be equal to or proportional to $r_2 * \omega_2$. In some embodiments, $\omega_2$ may be a vibration rate or angular velocity of the tree 422 and $r_2$ may be a displacement distance of the tree 422.

The solving engine 320 may group data points $\Theta_1$ and $V_{D1}$ and $\Theta_2$ and $V_{D2}$ into a cluster that illustrates a relationship between $\Theta$ and $V_D$, along with other data points. The solving engine 320 may determine or estimate values of $V_L$, $V_R$, $\Theta$ and $\gamma$ using a signal model such as $V_D = V_L \cos(\Theta + \beta) + V_R \sin(\Theta + \beta - \gamma)$, and the multiple data points including $\Theta_1$ and $V_{D1}$ and $\Theta_2$ and $V_{D2}$. In some embodiments, $\beta$ may be an azimuth offset angle or a mounting offset angle of the active Doppler sensor 412; and $\gamma$ may be a mounting angle of the active Doppler sensor 412, as described with respect to FIG. 3. For example, the solving engine 320 may determine values of $V_L$, $V_R$, $\beta$ and $\gamma$ for which the signal model converges.

Figure 4B:
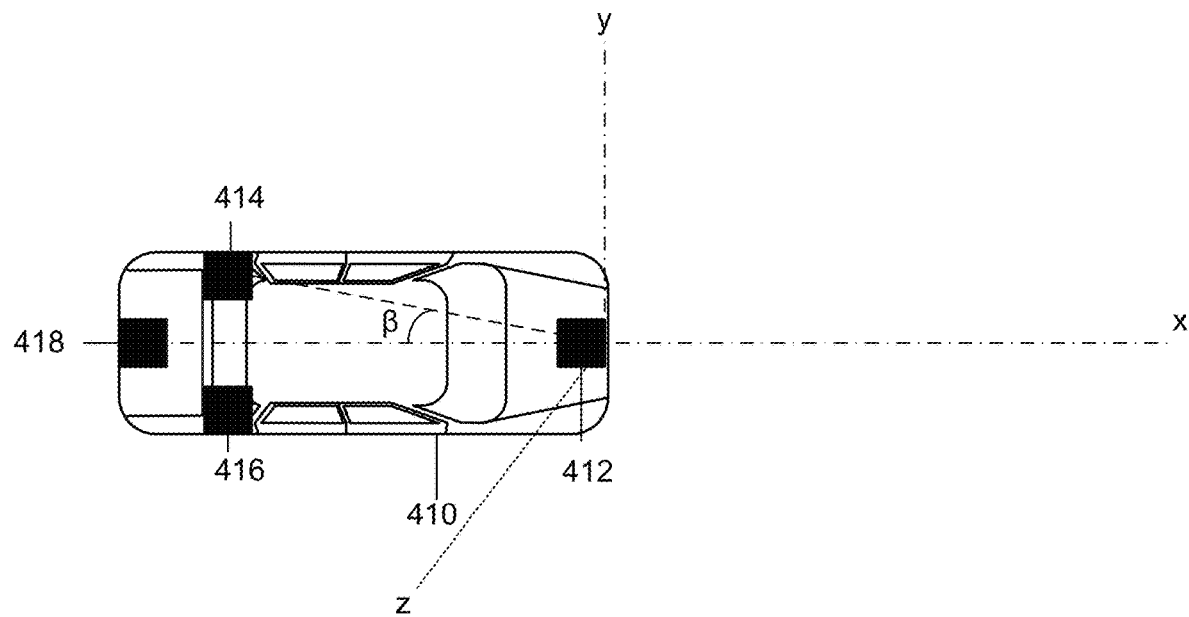

FIG. 4B illustrates how $\beta$ may be determined. In FIG. 4B, the vehicle 410, which may be implemented as the vehicle 100, may comprise active Doppler sensors 412, 414, 416, and 418, and may be driving on a ground parallel to an x-y plane. A forward direction of the vehicle 410 may be in a direction of the x-axis. As an illustrative example, the angle between the x-axis and the active Doppler sensor 414 may be determined as $\beta$. In some embodiments, $\beta$ may be between 0 and 90 degrees.

Figure 4C:
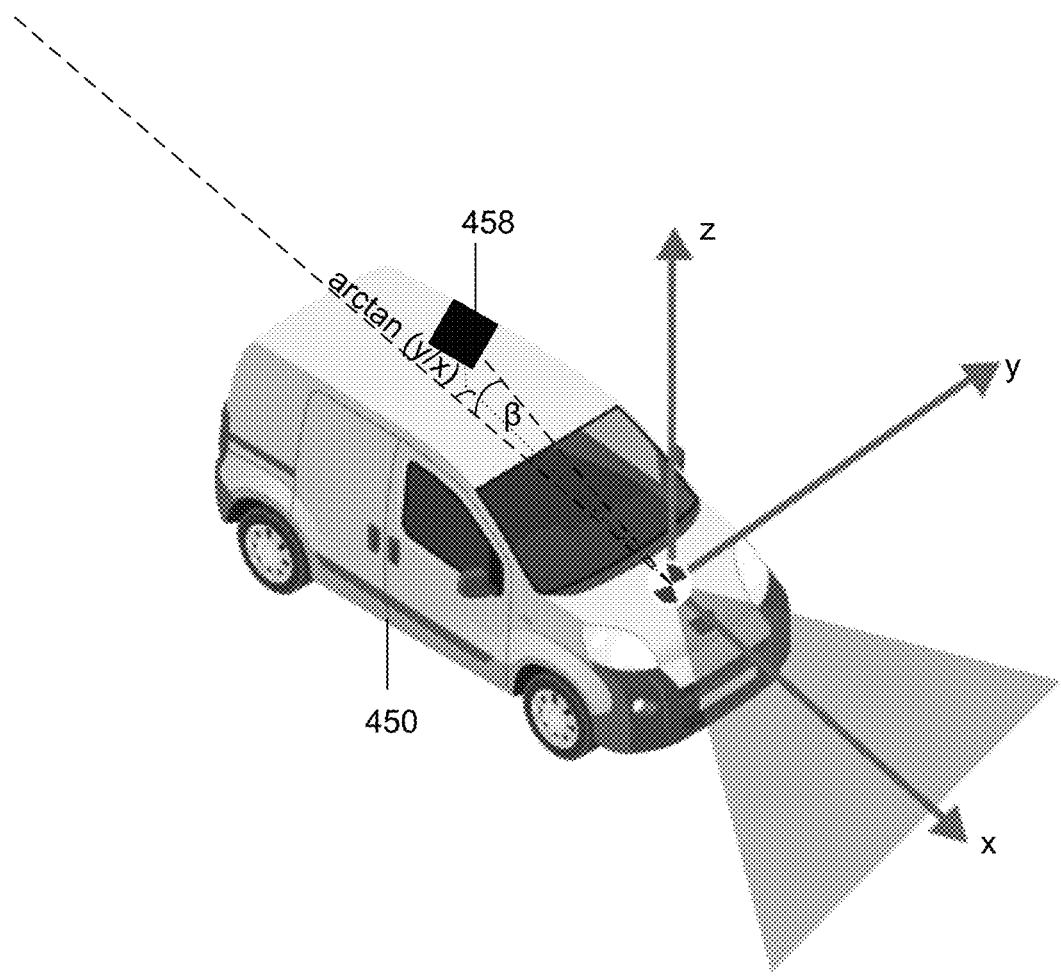

FIG. 4C illustrates how $\beta$ and $\gamma$ may be determined. In FIG. 4C, a vehicle 450, which may be implemented as the vehicle 410 or the vehicle 100, may comprise an active Doppler sensor 458. The vehicle 450 may be driving on a ground, which may be situated on an x-y plane defined by an x-axis and a y-axis. A direction of the x-axis may indicate a forward direction of the vehicle 450. As an illustrative example, the angle between the x-axis and the active Doppler sensor 458 may be determined as $\beta$. In some embodiments, $\beta$ may be between 0 and 90 degrees. In some embodiments, $\gamma$ may be determined as $\gamma = \beta - \arctan(y/x)$. In some examples, $\arctan(y/x)$ may be determined by first projecting the active Doppler sensor 458 onto the x-y plane, and determine y and x as respective distances of the projected active Doppler sensor 458 in a y-direction and a x-direction, respectively.

Figure 5A:
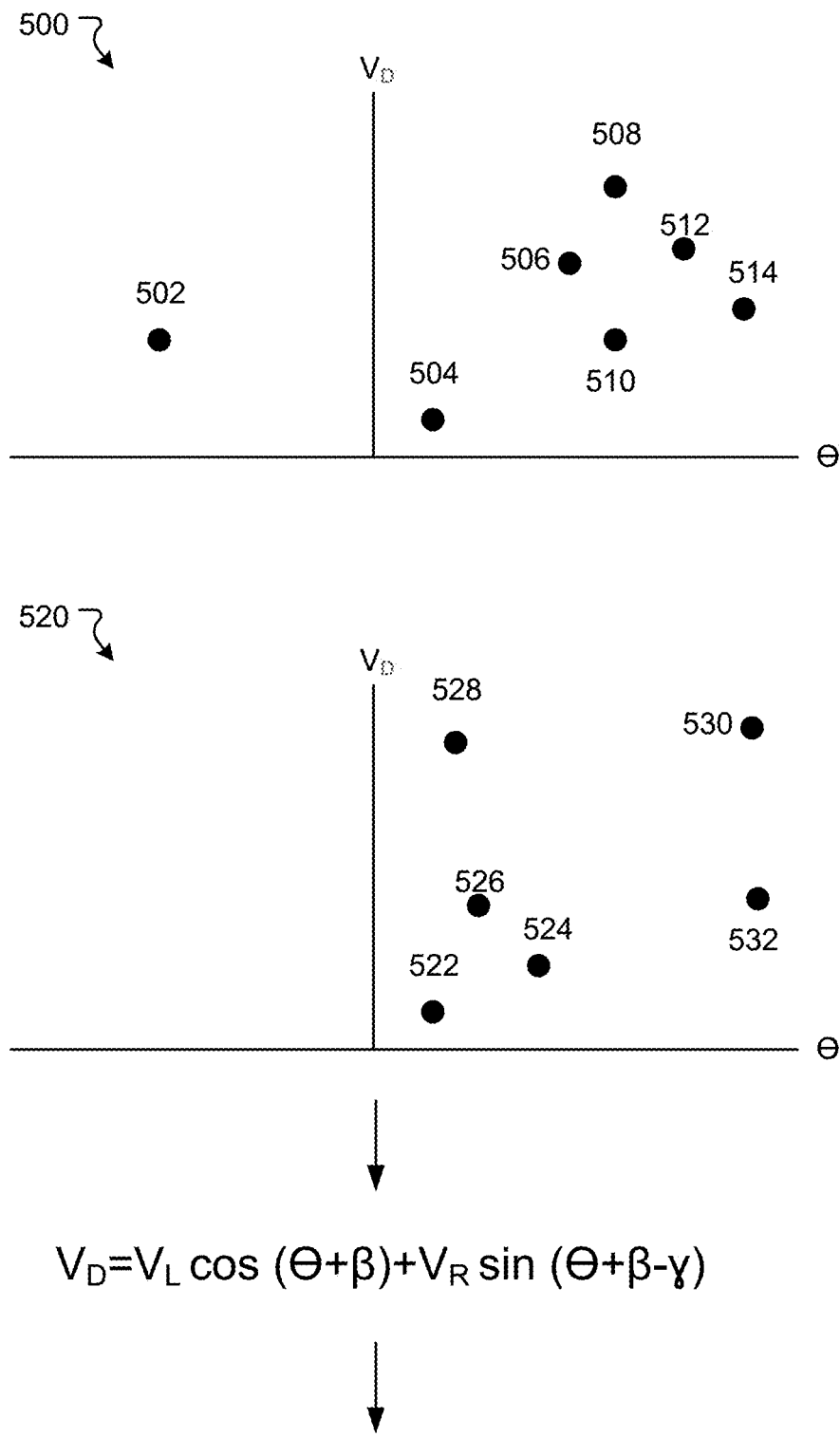
Figure 5B:
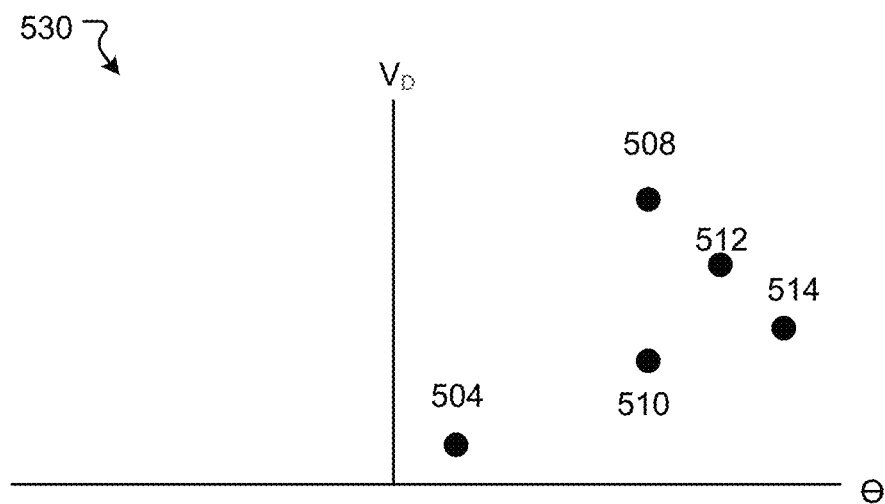

FIGS. 5A-5B illustrates a clustering of data points as described, for example, with respect to the previous FIGS. In some embodiments, the solving engine 320 may organize data points into clusters 500 and 520. The cluster 500 may comprise data points 502, 504, 506, 508, 510, 512, and 514. For example, the data point 504 may correspond to coordinates of $\theta_1$ and $V_{D1}$, and the data point 502 may correspond to coordinates of $\Theta_2$ and $V_{D2}$, as described in FIGS. 4A, 4B, and 4C. The cluster 520 may include data points from different objects or entities from the cluster 500. After the solving engine 320 determines a fit between a signal model such as $V_D = V_L \cos(\Theta + \beta) + V_R \sin(\Theta + \beta - \gamma)$, the solving engine 320, for example, may determine to remove the cluster 520 because of, or based on, a fitting error between the cluster 520 and the signal model being greater than a threshold, or a determined value of $V_L$ and/or $V_R$ deviating from respective values obtained from a GPS or IMU. The solving engine 320 may keep the cluster 500 and remove the data points 502 and 506 determined to be outliers to form an updated cluster 530.

The solving engine 320 may transmit the determined values of $V_L$, $V_R$, $\beta$ and $\gamma$ to the active Doppler sensors 412, 414, 416, and 418. The active Doppler sensors may obtain data based on, or using the determined values of $V_L$, $V_R$, $\beta$ and $\gamma$.

In 6A, 6B, 7A, 7B, 8A, 8B, 9A, 9B, 10A, and 10B, a vehicle (e.g., 610, 710, 810, 910, 1010) may use sensor data obtained, for example, based on or using a determined location and/or orientation of the vehicle, to navigate the vehicle on a road, and further, to determine a driving action, such as whether or not to perform an action of yielding or whether or not to make a left turn. Additionally, a vehicle may take a driving action based on a likelihood of avoiding a collision with one or more other vehicles or a pedestrian.

Figure 6B:
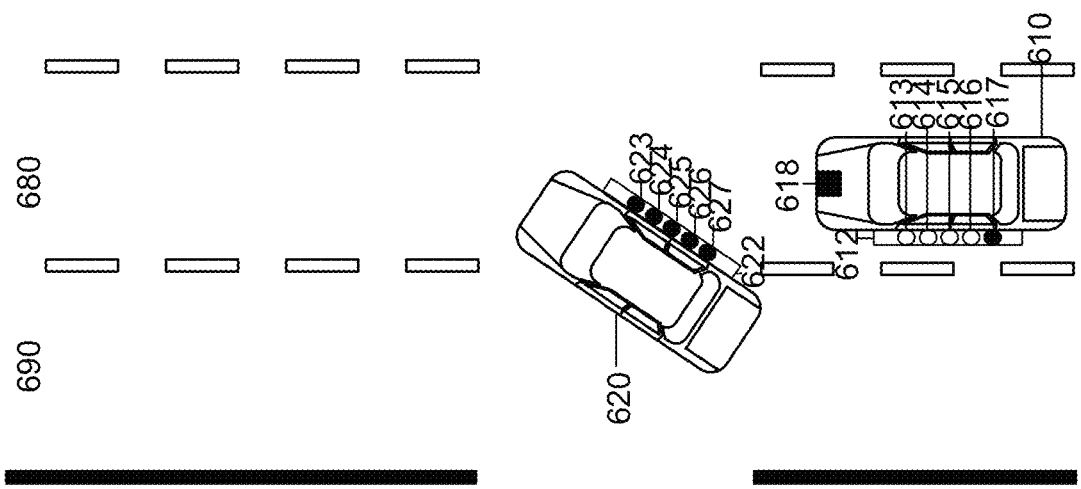

In the implementation 600 of FIGS. 6A-6B, a vehicle 610, which may be implemented as the vehicle 100, may be driving in a lane 680. The vehicle 610 may comprise an active Doppler sensor 618 and/or other sensors used to obtain data of an environment of the vehicle 610, such as detecting another vehicle 620. Although only one active Doppler sensor 618 is shown, additional active Doppler sensors and/or other sensors may be provided on the vehicle 610. For example, the vehicle 610, via the navigating engine 322, may determine its location and/or orientation on a road, and determine, based on or using the determined location and/or orientation, whether adequate room or space is available to maneuver between other vehicles and other obstacles such as sidewalks, curbs, and lane dividers. The vehicle 610 may comprise an array 612 of lights, which may include lights 613, 614, 615, 616, and 617. In some embodiments, the array 612 may comprise any number of lights. Five lights are shown merely for illustrative purposes. The another vehicle 620, which may be an AV, may be driving in a lane 690 to a left side of the vehicle 610. The another vehicle 620 may comprise an array 622 of lights, which may include lights 623, 624, 625, 626, and 627, on a right side of the another vehicle 620, which is the side closest to the vehicle 610. In some embodiments, the array 622 may comprise any number of lights. Five lights are shown merely for illustrative purposes. The another vehicle 620 may flash or blink the array 622 of lights such that each of the lights 623, 624, 625, 626, and 627 may be flashing or blinking (shown as darkened), in order to signal to the vehicle 610 that the another vehicle 620 intends to pass or overtake the vehicle 610 and merge into the lane 680. In some embodiments, the signal from the another vehicle 620 may only be shown on a side closest to the vehicle 610. For example, no lights on a front, back, or left portion of the another vehicle 620 may be flashing or blinking. In response to the another vehicle 620 flashing or blinking the array 622 of lights, the vehicle 610 may detect and recognize, via the navigating engine 322 and/or other processors, that the another vehicle 620 intends to merge into the lane 680. The vehicle 610 may be configured to recognize different patterns or sequences of flashing or blinking lights, or other signals, as signals or indications that the another vehicle 620 intends to merge into the lane 680. The vehicle 610 may, via a processor such as the navigating engine 322, provide a response signal that the vehicle 610 intends to yield to the another vehicle 620 and allow the another vehicle 620 to merge into the lane 680. The response signal may be that the array 612 of lights pulses or moves from side to side or back and forth. For example, only one or only some of the lights in the array 612 may be illuminated, flashing, or flickering at one time. Initially, only the light 613 (shown as darkened) may be illuminated, flashing, or flickering; then the light 617 may be illuminated, flashing, or flickering; next, the light 616 may be illuminated, flashing, or flickering; subsequently, the light 615 may be illuminated, flashing, or flickering; then, the light 614 may be illuminated, flashing, or flickering. In some embodiments, two adjacent lights may be illuminated, flashing, or flickering at one time, as the response signal of the vehicle 610. As an example, initially, only the lights 613 and 614 may be illuminated, flashing, or flickering; then the lights 613 and 617 may be illuminated, flashing, or flickering; next, the lights 616 and 617 may be illuminated, flashing, or flickering; subsequently, the lights 615 and 616 may be illuminated, flashing, or flickering; then, the lights 614 and 615 may be illuminated, flashing, or flickering. In some embodiments, the response signal may only be shown on a side closest to the another vehicle 620. For example, no lights on a front, back, or right portion of the vehicle 610 may be illuminated, flashing, or flickering. The another vehicle 620 may be configured to detect different patterns or sequences of illuminated, flashing, or flickering lights from the vehicle 610, as a signal that the vehicle 610 intends to yield. Upon detecting that the vehicle 610 intends to yield, the another vehicle 620 may speed up to overtake the vehicle 610 and merge into the lane 680. Once the another vehicle 620 has completed merging into the lane 680, the navigating engine 322 may cause the array 612 to terminate the response signal so that none of the lights in the array 612 is illuminated, flashing, or flickering. Additionally, the another vehicle 620 may terminate the signal so that none of the lights in the array 622 of lights is illuminated, flashing, or flickering.

Figure 7A:
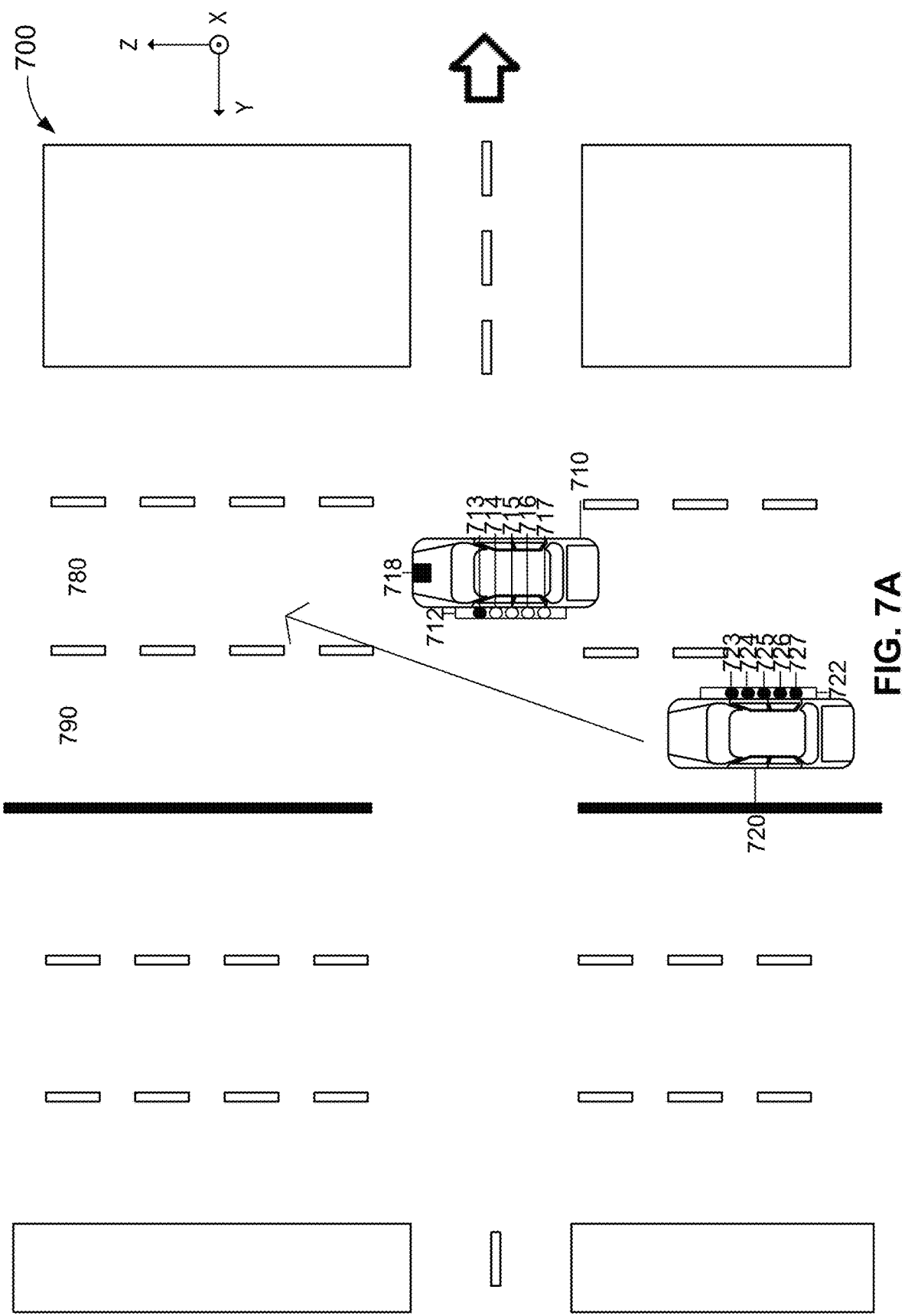

In the implementation 700 of FIGS. 7A-7B, a vehicle 710, which may be implemented as vehicle 100, may be driving in a lane 780. The vehicle 710 may comprise an active Doppler sensor 718 and/or other sensors used to obtain data of an environment of the vehicle 710, such as detecting another vehicle 720. Although only one active Doppler sensor 718 is shown, additional active Doppler sensors may be provided on the vehicle 710. For example, the vehicle 710, via the navigating engine 322, may determine its location and/or orientation on a road, and determine, based on or using the determined location and/or orientation, whether adequate room or space is available to maneuver between other vehicles and other obstacles such as sidewalks, curbs, and lane dividers. The vehicle 710 may comprise an array 712 of lights, which may include lights 713, 714, 715, 716, and 717. In some embodiments, the array 712 may comprise any number of lights. Five lights are shown merely for illustrative purposes. The another vehicle 720, which may be an AV, may be driving in a lane 790 to a left side of the vehicle 710. The another vehicle 720 may comprise an array 722 of lights, which may include lights 723, 724, 725, 726, and 727, on a right side of the another vehicle 720, which is the side closest to the vehicle 710. In some embodiments, the array 722 may comprise any number of lights. Five lights are shown merely for illustrative purposes. The implementation of FIGS. 7A-7B may be similar to that of FIGS. 6A-6B, except that the another vehicle 720 is completely behind the vehicle 710. In other words, no portion of the vehicle 710 is aligned with any portion of the another vehicle 720. The vehicle 710 may still detect the signal from the another vehicle 720 that the another vehicle 720 intends to merge into the lane 780 in front of the vehicle 710. The vehicle 710 may then, via the navigating engine 322 and/or other processors, determine an intended action to be yielding to the another vehicle 720, signal to the another vehicle 720 with the array 712 of lights that the vehicle 710 intends to yield, and slow down to allow the another vehicle 720 to overtake the vehicle 710.

In the implementation 800 of FIGS. 8A-8B, a vehicle 810, which may be implemented as vehicle 100, may be driving in a lane 880. The vehicle 810 may comprise an active Doppler sensor 818 and/or other sensors used to obtain data of an environment of the vehicle 810, such as detecting another vehicle 820. Although only one active Doppler sensor 818 is shown, additional active Doppler sensors may be provided on the vehicle 810. For example, the vehicle 810, via the navigating engine 322, may determine its location and/or orientation on a road, and determine, based on or using the determined location and/or orientation, whether adequate room or space is available to maneuver between other vehicles and other obstacles such as sidewalks, curbs, and lane dividers. The vehicle 810 may comprise an array 812 of lights, which may include lights 813, 814, 815, 816, and 817. In some embodiments, the array 812 may comprise any number of lights. Five lights are shown merely for illustrative purposes. The another vehicle 820, which may be an AV, may be driving in a lane 890 to a left side of the vehicle 810. The another vehicle 820 may comprise an array 822 of lights, which may include lights 823, 824, 825, 826, and 827, on a right side of the another vehicle 820, which is the side closest to the vehicle 810. In some embodiments, the array 822 may comprise any number of lights. Five lights are shown merely for illustrative purposes. The implementation of FIGS. 8A-8B may be similar to that of FIGS. 6A-6B, except that the another vehicle 820 may not be signaling with the array 822 of lights. As shown in FIGS. 8A-8B, the array 822 of lights is not flashing or blinking. However, the vehicle 810 may still detect a lateral movement from the another vehicle 820 towards the vehicle 810, such as a distance of a lateral movement towards the vehicle 810 that exceeds a threshold amount. The lateral movement may be in a direction perpendicular to the driving direction of the vehicle 810. The vehicle 810 may detect the lateral movement as a signal that the another vehicle 820 intends to merge into the lane 880. The vehicle 810 may then, via the navigating engine 322 and/or other processors, determine an intended action to be yielding to the another vehicle 820, signal to the another vehicle 820 that the vehicle 810 intends to yield with the array 812 of lights, and slow down to allow the another vehicle 820 to overtake the vehicle 810. In some embodiments, the vehicle 810 may only detect the lateral movement of a vehicle (such as another vehicle 820) if the another vehicle 820 is not completely behind or ahead of the vehicle 810. If the another vehicle 820 is completely behind or ahead of the vehicle 810, the vehicle 810 may only detect that the another vehicle 820 intends to merge into the lane 880 if the another vehicle 820 signals via the array 822.

Figure 9A:
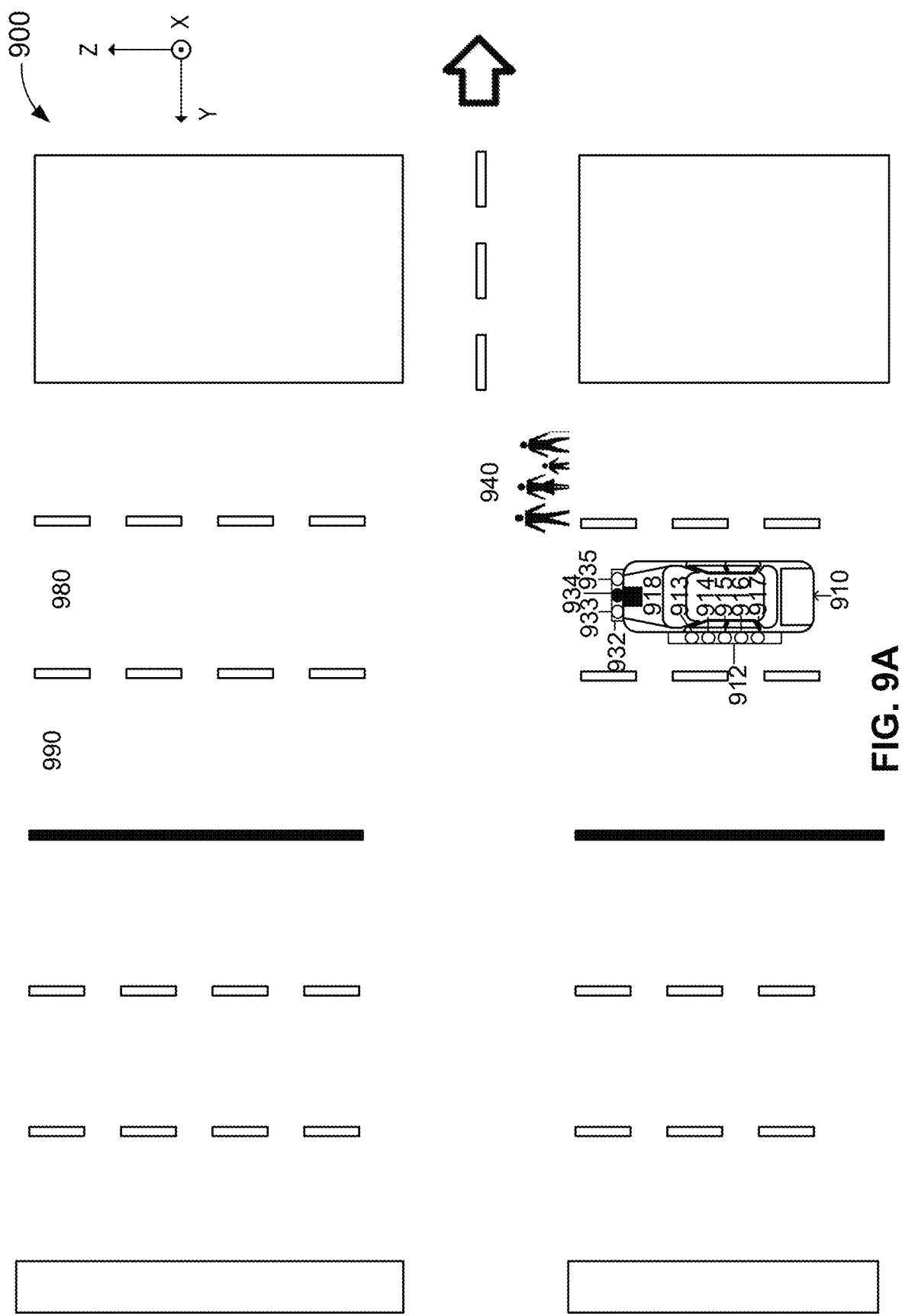

In the implementation 900 of FIGS. 9A-9B, a vehicle 910, which may be implemented as vehicle 100, may be driving in a lane 980. The vehicle 910 may comprise an active Doppler sensor 918 and/or other sensors used to obtain data of an environment of the vehicle 910, such as detecting another vehicle or one or more pedestrians 940. Although only one active Doppler sensor 918 is shown, additional active Doppler sensors may be provided on the vehicle 910. For example, the vehicle 910, via the navigating engine 322, may determine its location and/or orientation on a road, and determine, based on or using the determined location and/or orientation, whether adequate room or space is available to maneuver between other vehicles and other obstacles such as sidewalks, curbs, and lane dividers. The vehicle 910 may comprise an array 912 of lights on a left side of the vehicle 910, which may include lights 913, 914, 915, 916, and 917. In some embodiments, the array 912 may comprise any number of lights. Five lights are shown merely for illustrative purposes. The vehicle 910 may further comprise a second array 932 of lights at a front side. The second array 932 may include lights 933, 934, and 935. In some embodiments, the second array 932 may comprise any number of lights. Three lights are shown merely for illustrative purposes. In response to the one or more pedestrians 940 making a hand signal or walking onto a road, the vehicle 910 may detect and recognize, via one or more processors such as the navigating engine 322, that the one or more pedestrians 940 intend to cross the road. The vehicle 910 may, via the navigating engine 322, provide a response signal that the vehicle 910 intends to yield to the one or more pedestrians 940 and allow the one or more pedestrians 940 to cross the road through the lane 980 and lane 990. The response signal may be that the second array 932 of lights pulses or moves from side to side or back and forth. For example, only one or only some of the lights in the second array 932 may be illuminated, flashing, or flickering at one time. Initially, only the light 934 (shown as darkened) may be illuminated, flashing, or flickering; then the light 935 may be illuminated, flashing, or flickering; next, the light 933 may be illuminated, flashing, or flickering. In some embodiments, two adjacent lights may be illuminated, flashing, or flickering at one time, as the response signal of the vehicle 910. As an example, initially, only the lights 933 and 934 may be illuminated, flashing, or flickering; then the lights 934 and 935 may be illuminated, flashing, or flickering; next, the lights 935 and 936 may be illuminated, flashing, or flickering. In some embodiments, the response signal may only be shown on a side closest to the one or more pedestrians 940. For example, no lights on a left, back, or right portion of the vehicle 910 may be illuminated, flashing, or flickering. As seen in FIGS. 9A-9B, only the second array 932 of lights may be illuminated, flashing, or flickering, and the array 912 of lights may not be illuminated, flashing, or flickering. Upon detecting that the vehicle 910 intends to yield, the one or more pedestrians 940 may cross the road. The vehicle 910 may be completely stopped while the one or more pedestrians 940 are crossing the road. Once the one or more pedestrians 940 have finished crossing the road, one or more processors such as the navigating engine 322 and/or other processors may cause the array 932 to terminate the response signal so that none of the lights in the array 932 is illuminated, flashing, or flickering. The vehicle 910 may then continue driving.

Figure 10A:
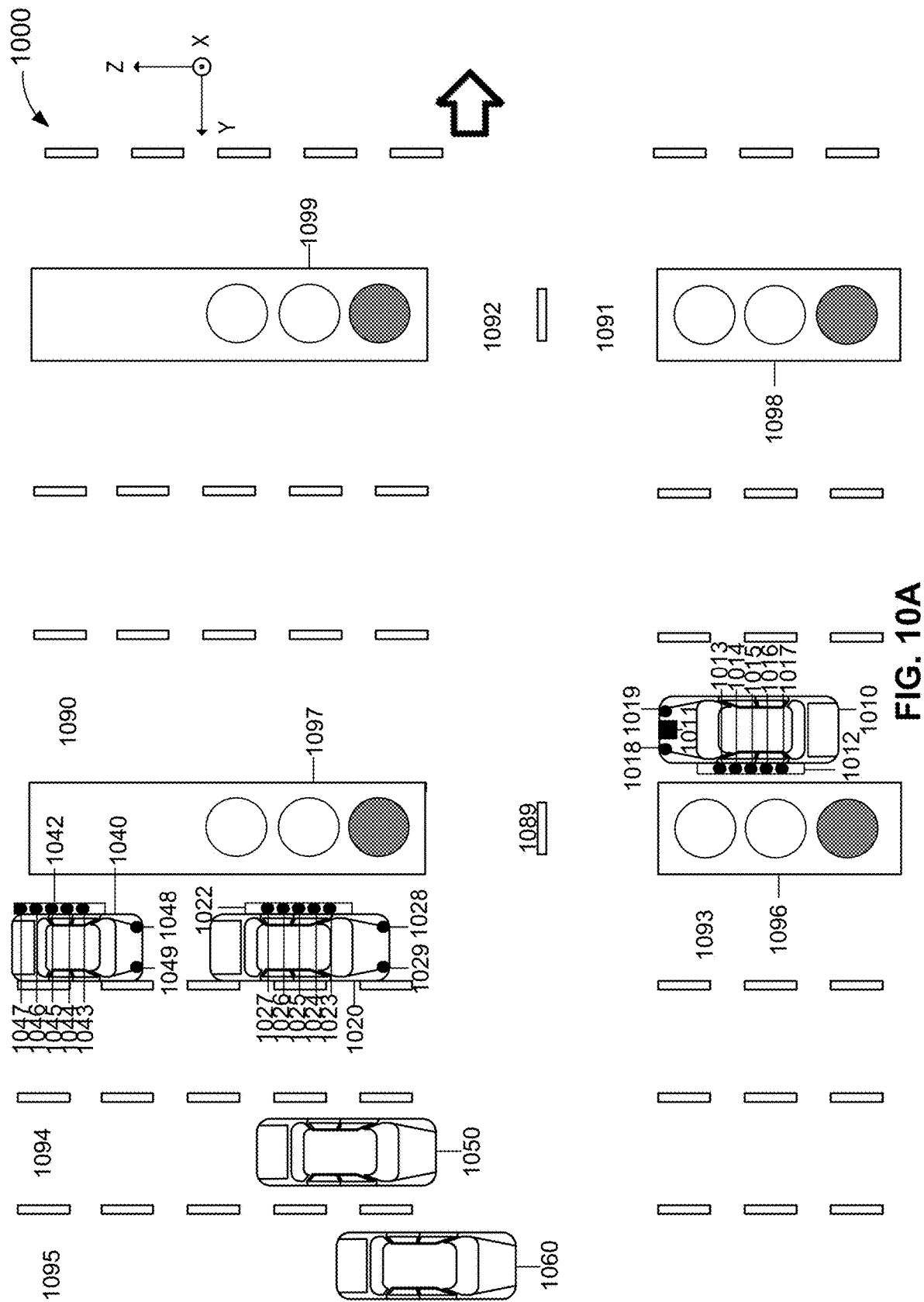
Figure 10B:
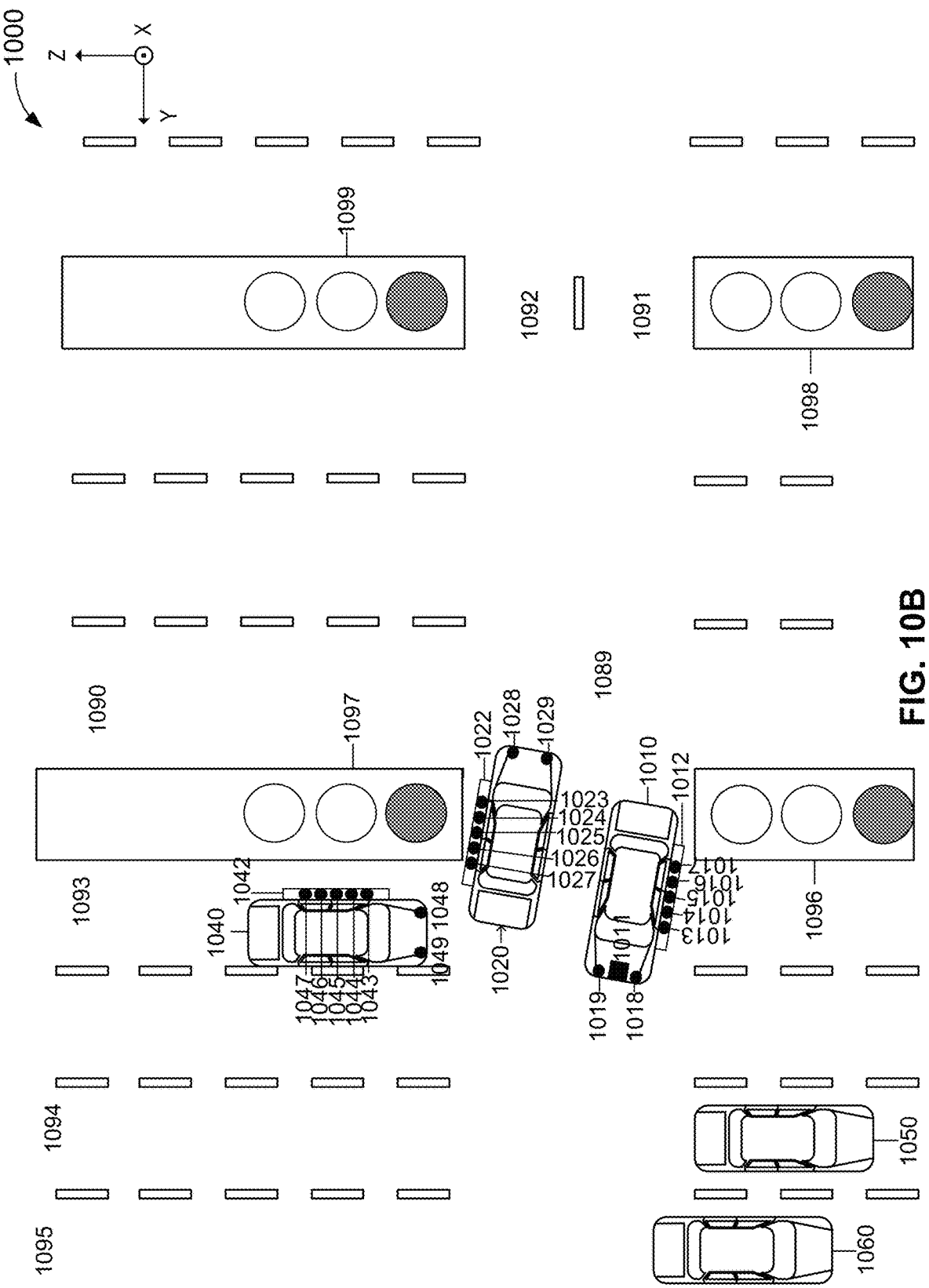

In the implementation 1000 of FIGS. 10A-10B, a vehicle 1010 may, via the navigating engine 322, determine whether it would be safe to make a 90 degree left turn, for example, at an intersection. Although only one active Doppler sensor 1011 is shown, additional active Doppler sensors may be provided on the vehicle 1010. The vehicle 1010, which may be implemented as vehicle 100, may be driving in a lane 1090. For example, the vehicle 1010, via the navigating engine 322, may determine its location and/or orientation at the intersection, and determine, based on or using the determined location and/or orientation, whether adequate room or space is available to maneuver between other vehicles and other obstacles such as sidewalks, curbs, and lane dividers. The vehicle 1010 may comprise an active Doppler sensor 1011 and/or other sensors used to obtain data of an environment of the vehicle 1010. For example, the active Doppler sensor 1011 may detect a second vehicle 1020. One or more other processors may predict a path of the second vehicle 1020, and determine whether the second vehicle 1020 may safely avoid a collision with the another vehicle 1020. The vehicle 1010 may comprise an array 1012 of lights, which may include lights 1013, 1014, 1015, 1016, and 1017, on a left side of the vehicle 1010, and turn lights 1018 and 1019 on a front of the vehicle 1010. In some embodiments, the array 1012 may comprise any number of lights. Five lights are shown merely for illustrative purposes. A processor of the vehicle 1010 may illuminate, flash or blink the array 1012 of lights such that each of the lights 1013, 1014, 1015, 1016, and 1017 may be flashing or blinking (shown as darkened), in order to signal to another vehicle that the vehicle 1010 intends to turn left or to move into a lane to a left of the vehicle 1010. In some embodiments, the vehicle 1010 may flash or blink the array 1012 of lights, in addition to flashing or blinking the turn lights 1018 and 1019, in order to signal that the vehicle 1010 intends to turn left. In some embodiments, the vehicle 1010 may flash or blink only the turn light 1018 to signal that the vehicle 1010 intends to turn left. In some embodiments, the vehicle 1010 may flash or blink only one of the turn lights 1018 or 1019 disposed on a side of a direction that the vehicle 1010 intends to turn. For example, the vehicle 1010 may flash or blink only the turn light 1019 to signal that the vehicle 1010 intends to turn right.

The second vehicle 1020 and a third vehicle 1040, which may each be a vehicle such as an AV, may be driving in a lane 1093 and travelling in an opposite direction with respect to the vehicle 1010. The second vehicle 1020 may comprise an array 1022 of lights, which may include lights 1023, 1024, 1025, 1026, and 1027, on a left side of the second vehicle 1020, and turn lights 1028 and 1029 at a front of the second vehicle 1020. A processor of the second vehicle 1020 may illuminate, flash or blink the array 1022 of lights such that each of the lights 1023, 1024, 1025, 1026, and 1027 may be flashing or blinking (shown as darkened), in order to signal to another vehicle that the second vehicle 1020 intends to turn left, for example, into a lane 1092, or to move into a lane to a left of the second vehicle 1020. In some embodiments, the second vehicle 1020 may illuminate, flash or blink the array 1022 of lights, in addition to flashing or blinking the turn lights 1028 and 1029, in order to signal that the second vehicle 1020 intends to turn left. In some embodiments, the second vehicle 1020 may illuminate, flash or blink only the turn light 1028 to signal that the vehicle 1020 intends to turn left. In some embodiments, the second vehicle 1020 may illuminate, flash or blink only one of the turn lights 1028 or 1029 disposed on a side of a direction that the second vehicle 1020 intends to turn. For example, the second vehicle 1020 may illuminate, flash or blink only the turn light 1029 to signal that the vehicle 1020 intends to turn right. The third vehicle 1040 may comprise an array 1042 of lights, which may include lights 1043, 1044, 1045, 1046, and 1047, on a left side of the third vehicle 1040, and turn lights 1048 and 1049. The array 1042 may operate in a manner similar to a manner of the array 1022, and the turn lights 1048 and 1049 may operate in a manner similar to a manner of the turn lights 1028 and 1029. A fourth vehicle 1050 may be travelling in a lane 1094 and a fifth vehicle 1060 may be travelling in a lane 1095, in a same direction as the second vehicle 1020 and the third vehicle 1040.

When the vehicle 1010 approaches an intersection 1089, the vehicle 1010 may detect and recognize one or more traffic lights 1096, 1097, 1098, and 1099, via one or more processors such as the navigating engine 322. The vehicle 1010 may signal an intent to turn into a lane 1091. The vehicle 1010 may determine whether or not, and/or when, to make a 90-degree turn at an intersection 1089 at least based on a signal of the one or more traffic lights 1096, 1097, 1098, and 1099, for example, whether the one or more traffic lights 1096, 1097, 1098, and 1099 are green, a distance from the intersection 1089 of one or more of the vehicles 1020, 1040, 1050, and 1060 travelling in an opposite direction, and/or one or more signals such as from the array 1022, the turn lights 1028 and 1029, the array 1042, and the turn lights 1048 and 1049. In some examples, a processor of the vehicle 1010 such as the navigating engine 322 may determine that it is safe to make a 90-degree left turn even if the second vehicle 1020 is approaching the intersection 1089, if the array 1022 of lights and/or one or more of the turn lights 1028 and 1029 are illuminated, flashing, or blinking to indicate that the second vehicle 1020 will also be making a 90-degree left turn. Similarly, a processor of the vehicle 1010 such as the navigating engine 322 may determine that it is safe to make a 90-degree left turn even if the third vehicle 1040 is approaching the intersection 1089, and the third vehicle 1040 is signaling that it plans to make a left turn. In some examples, the one or more processors such as the navigating engine 322 may detect that the array 1022 of lights is illuminated or flashing and determine that the second vehicle 1020 will be making a 90-degree left turn, if the second vehicle 1020 is in a leftmost lane. In some examples, the one or more processors such as the navigating engine 322 may detect that the turn light 1028 is illuminated or flashing and determine that the second vehicle 1020 will be making a 90-degree left turn. In response to determining that the second vehicle 1020 will be making a 90-degree left turn, the one or more processors such as the navigating engine 322 may determine that it is safe for the vehicle 1010 to make a 90-degree left turn and the one or more processors such as the navigating engine 322 may cause the vehicle 1010 to, or initiate the vehicle 1010 to, make a left turn. In some embodiments, one or more processors of the vehicle 1010 may further determine a safety of making a 90-degree left turn by determining a speed or velocity of one or more of the second vehicle 1020, the third vehicle 1040, the fourth vehicle 1050, the fifth vehicle 1060, and any pedestrians passing through the intersection 1089. The one or more processors of the vehicle 1010 such as the navigating engine 322 may further predict trajectories or paths of one or more of the second vehicle 1020, the third vehicle 1040, the fourth vehicle 1050, and the fifth vehicle 1060, based at least in part on the respective speeds or velocities of the second vehicle 1020, the third vehicle 1040, the fourth vehicle 1050, the fifth vehicle 1060, and any pedestrians passing through the intersection 1089. The one or more processors of the vehicle 1010 such as the navigating engine 322 may further predict trajectories or paths of one or more of the second vehicle 1020 and the third vehicle 1040 based in part on a turning angle or radius of the one or more of the second vehicle 1020 and the third vehicle 1040. The one or more processors of the vehicle 1010 such as the navigating engine 322 may further predict trajectories or paths of one or more of the second vehicle 1020 and the third vehicle 1040, if the second vehicle 1020 and/or the third vehicle 1040 does not actually make a left turn even though the second vehicle 1020 and/or the third vehicle 1040 are signaling their intents to make a left turn. For example, the second vehicle 1020 and/or the third vehicle 1040 may change intended paths from a left turn to going straight. The one or more processors of the vehicle 1010 such as the navigating engine 322 may further predict a trajectory or path of the vehicle 1010 based on a velocity of the vehicle 1010 and a turning angle or turning radius of the vehicle 1010. The one or more processors of the vehicle 1010 such as the navigating engine 322 may further determine that it is safe for the vehicle 1010 to make a 90-degree left turn in response to the predicted trajectories or paths of the vehicle 1010 being separated from the trajectories or paths of one or more of the second vehicle 1020, the third vehicle 1040, the fourth vehicle 1050, and the fifth vehicle 1060 by at least a threshold distance at any time period, or at all instances of the time period, during which any portion of the vehicle 1010 is predicted to cross or traverse the lanes 1093, 1094, and 1095, and otherwise determine that it is not safe for the vehicle 1010 to make the 90-degree left turn if the predicted trajectories or paths of the vehicle 1010 are not separated from the trajectories or paths of one or more of the second vehicle 1020, the third vehicle 1040, the fourth vehicle 1050, and the fifth vehicle 1060 by at least a threshold distance during a period at which any portion of the vehicle 1010 is predicted to cross or traverse the lanes 1093, 1094, and 1095. The one or more processors of the vehicle 1010 such as the navigating engine 322 may further determine that it is safe for the vehicle 1010 to make a 90-degree left turn if, or in response to, the predicted trajectories or paths of the vehicle 1010 being separated from the trajectories or paths of the one or more pedestrians by more than a second threshold distance at any time during which any portion of the vehicle crosses or traverses the intersection 1089. In response to the one or more processors of the vehicle 1010 such as the navigating engine 322 determining that it is safe for the vehicle 1010 to make a 90-degree left turn, the one or more processors such as the navigating engine 322 may direct, instruct, or control the vehicle 1010 to initiate the 90-degree left turn. If the vehicle 1010 initiates a 90-degree left turn, the one or more processors of the vehicle 1010 such as the navigating engine 322 may take precautions to further reduce or eliminate a possibility of a collision. For example, the vehicle 1010 may, by the navigating engine 322, be controlled to stop, or speed up to avoid a collision, if a distance between the vehicle 1010 and any of the second vehicle 1020, the third vehicle 1040, the fourth vehicle 1050, and the fifth vehicle 1060 is less than a threshold distance at any time during which any portion of the vehicle 1010 crosses or traverses the lanes 1093, 1094, and 1095. As another example, once a vehicle 1010 initiates a 90-degree left turn, the vehicle 1010 may, by the navigating engine 322, be controlled to stop before a front of the vehicle 1010 traverses into the lane 1093, if the second vehicle 1020 is approaching the intersection 1089 and within a threshold distance of the vehicle 1010, even if the second vehicle 1020 is signaling an intent to turn. In such a manner, the vehicle 1010 may ensure that the second vehicle 1020 actually makes a 90-degree left turn at the intersection 1089, and would avoid a collision in case the second vehicle 1020 changes course right before the intersection 1089 and actually drives straight into and past the intersection 1089. In some examples, the vehicle 1010 may perform an action based on a likelihood of avoiding a collision with the second vehicle 1020, such as, performing an action most likely to avoiding the collision.

Figure 11:
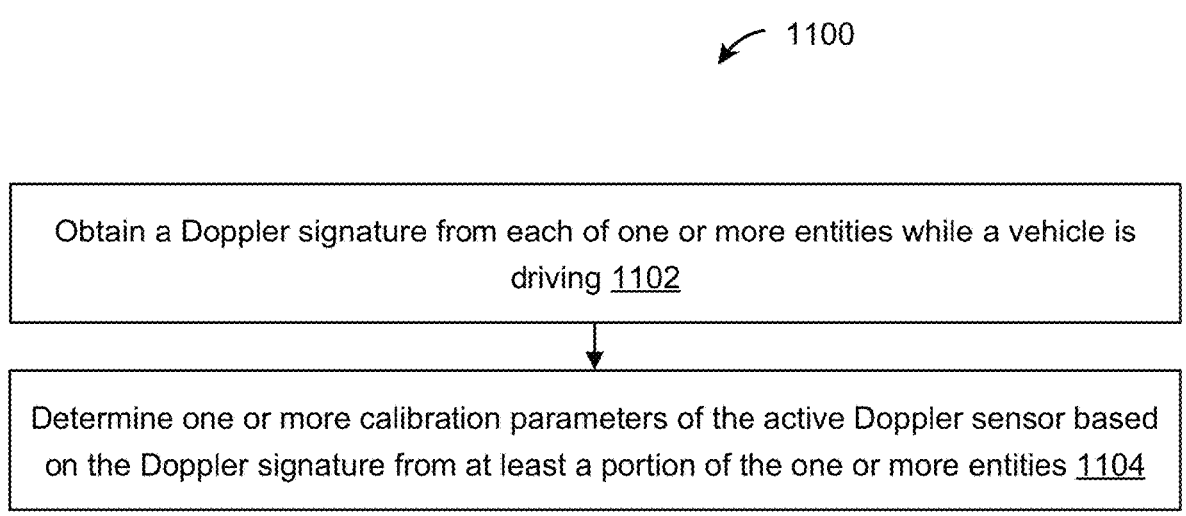
FIG. 11 illustrates a flowchart of an example of a method of obtaining a Doppler signature, determining one or more calibration parameters based on the Doppler signature, and determines a location and/or orientation based on the calibration parameters, according to an embodiment of the present disclosure.

FIG. 11 illustrates a flowchart of a method according to some embodiments. In this and other flowcharts, the flowchart 1100 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 11.

In step 1102, one or more sensors and/or processors may obtain a Doppler signature from each of one or more entities, for example, while a vehicle is driving. In step 1104, the one or more processors may determine one or more calibration parameters of the active Doppler sensor based on the Doppler signature from at least a portion of the one or more entities.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 12:
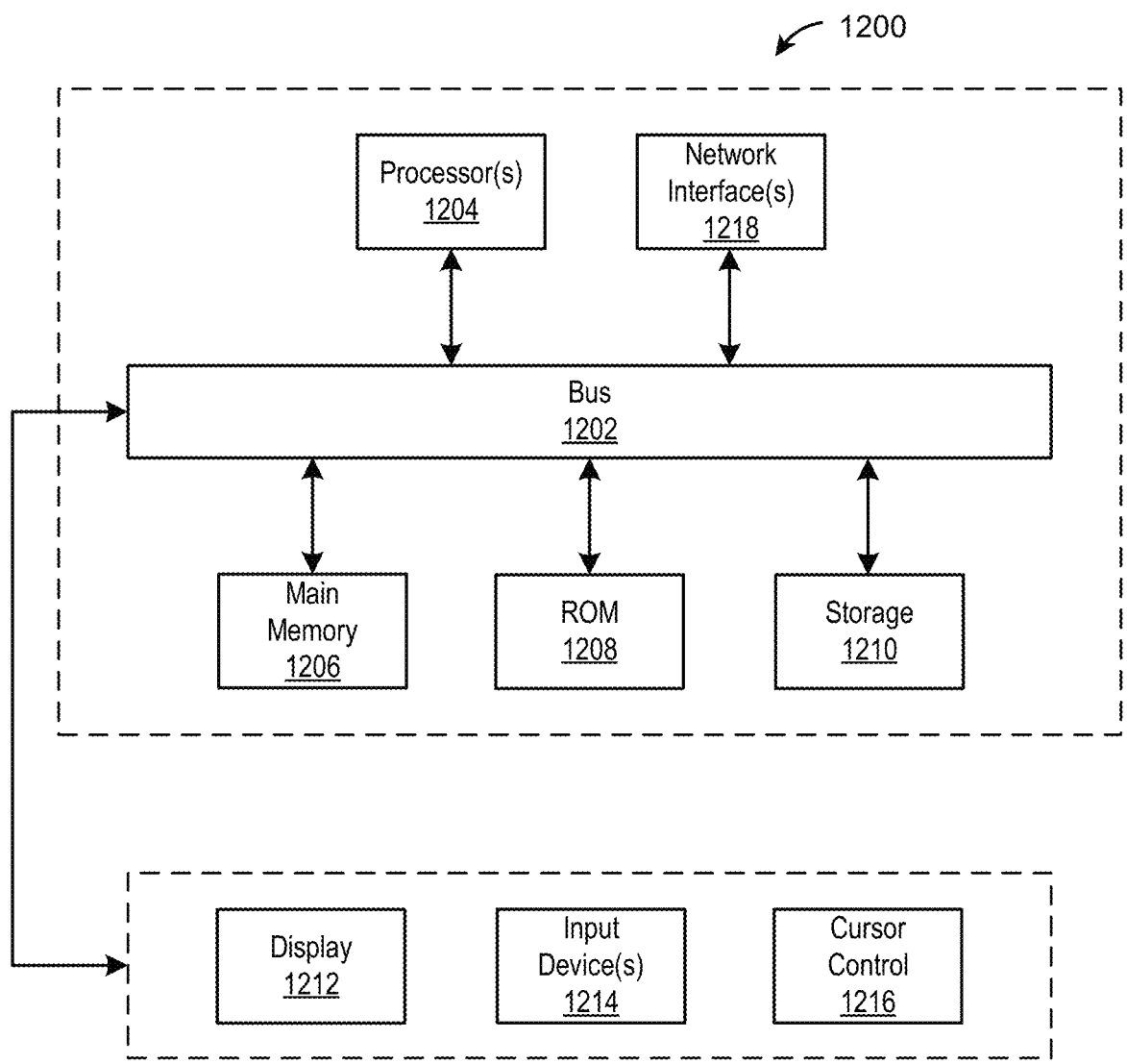
FIG. 12 is a diagram of an example computer system for implementing the features disclosed herein.

FIG. 12 is a block diagram that illustrates a computer system 1200 upon which any of the embodiments described herein may be implemented. The computer system 1200 includes a bus 1202 or other communication mechanism for communicating information, and one or more hardware processors 1204 coupled with bus 1202 for processing information. Hardware processor(s) 1204 may be, for example, one or more general purpose microprocessors.

The computer system 1200 also includes a main memory 1206, such as a random access memory (RAM), cache and/or other dynamic storage devices, coupled to bus 1202 for storing information and instructions to be executed by processor 1204. Main memory 1206 also may be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

The computer system 1200 further includes a read only memory (ROM) 1208 or other static storage device coupled to bus 1202 for storing static information and instructions for processor 1204. A storage device 1210, such as a magnetic disk, optical disk, or USB thumb drive (Flash drive), etc., is provided and coupled to bus 1202 for storing information and instructions.

The computer system 1200 may be coupled via bus 1202 to output device(s) 1212, such as a cathode ray tube (CRT) or LCD display (or touch screen), for displaying information to a computer user. Input device(s) 1214, including alphanumeric and other keys, are coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1200 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor(s) 1204 executing one or more sequences of one or more instructions contained in main memory 1206. Such instructions may be read into main memory 1206 from another storage medium, such as storage device 1210. Execution of the sequences of instructions contained in main memory 1206 causes processor(s) 1204 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1210. Volatile media includes dynamic memory, such as main memory 1206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may retrieves and executes the instructions. The instructions received by main memory 1206 may optionally be stored on storage device 1210 either before or after execution by processor 1204.

The computer system 1200 also includes a communication interface 1218 coupled to bus 1202. Communication interface 1218 provides a two-way data communication coupling to one or more network links that are connected to one or more local networks. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN (or WAN component to communicated with a WAN). Wireless links may also be implemented. In any such implementation, communication interface 1218 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1218, which carry the digital data to and from computer system 1200, are example forms of transmission media.

The computer system 1200 can send messages and receive data, including program code, through the network (s), network link and communication interface 1218. In the Internet example, a server might transmit a requested code for an application program through the Internet, the ISP, the local network and the communication interface 1218.

The received code may be executed by processor 1204 as it is received, and/or stored in storage device 1210, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which may include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system on a moving vehicle comprising:
    an active Doppler sensor;
    one or more processors; and
    a memory storing instructions that, when executed by the one or more processors, causes the system to perform:
        obtaining a Doppler velocity from each of one or more entities using the active Doppler sensor, wherein the Doppler velocity is with respect to the moving vehicle;
        determining one or more calibration parameters of the active Doppler sensor based on respective Doppler velocities from at least a portion of the entities, wherein the determining of the one or more calibration parameters comprises:
            determining one or more stationary entities, within the one or more entities;
            forming one or more clusters, each of the clusters comprising at least a portion of the one or more stationary entities and defining a relationship between a location of one of the entities with respect to the active Doppler sensor and the Doppler velocity of the respective one of the entities;
            fitting, to each of the one or more clusters, a signal model defining the Doppler velocities of the each of the entities in relation to a mounting offset angle or an azimuth offset angle of the active Doppler sensor and a mounting location of the active Doppler sensor;
            determining a degree of fit of the signal model to each of the one or more clusters;
            removing any of the clusters having a degree of fit lower than a threshold while retaining remaining clusters; and determining the one or more calibration parameters based on the retained remaining clusters;
        determining a location of the vehicle based on one or more of the calibration parameters; and
        causing the vehicle to perform a driving action based on the determined location.

2. The system of claim 1, wherein the determining the one or more calibration parameters further comprises:
    determining the mounting location, the mounting offset angle, a linear velocity component, and a rotational velocity component of the active Doppler sensor.

3. The system of claim 1, wherein the determining the location of the vehicle comprises determining the location of the vehicle by integrating the determined linear velocity component over time or the determined rotational velocity component over time.

4. The system of claim 3, wherein the instructions further cause the system to perform:
    comparing the determined location with a location obtained from a GPS or an IMU.

5. The system of claim 1, wherein:
    the signal model is defined by $V_D = V_L \cos(\Theta+\beta) + V_R \sin(\Theta+\beta-\gamma)$, and wherein:

the calibration parameters comprise $V_L$, $V_R$, $\beta$, and $\gamma$;

$V_D$ indicates the Doppler velocity of the each of the entities;

$V_L$ indicates a linear velocity component of the each of the entities in a forward direction of the vehicle;

$V_R$ indicates a rotational velocity component of the each of the entities;

$\Theta$ indicates an angle defining the location of the each of the entities with respect to the active Doppler sensor;

$\beta$ is the mounting offset angle of the active Doppler sensor; and $\gamma$ is defined as $\gamma=\beta-\arctan(y/x)$, wherein y and x define the mounting location of the active Doppler sensor with respect to an ego coordinate system of the vehicle.

6. The system of claim 5, wherein the determining the one or more calibration parameters further comprises:

determining, for each of the retained clusters, a first difference between the linear velocity component and a linear velocity obtained from a GPS or an IMU and a second difference between the rotational velocity component and a rotational velocity obtained from the GPS or the IMU;

removing any of the retained clusters in which the first difference is lower than a first threshold or the second difference is lower than a second threshold;

combining the unremoved clusters;

refitting the signal model to the combined clusters; and determining $V_L$, $V_R$, $\beta$, and $\gamma$.

7. The system of claim 6, wherein the determining the one or more calibration parameters further comprises:

obtaining the Doppler velocity, for a plurality of frames, from the each of the entities while the vehicle is driving; and determining the one or more calibration parameters based on the Doppler velocity from at least the portion of the entities, for the plurality of frames.

8. The system of claim 7, wherein the determining the one or more calibration parameters further comprises:

obtaining values of $V_L$, $V_R$, $\beta$, and $\gamma$ for each of the plurality of frames;

comparing the values of $V_L$, $V_R$, $\beta$, and $\gamma$, for each of the respective entities, between each of the plurality of frames;

determining whether any of the values of $V_L$, $V_R$, $\beta$, and $\gamma$ of any of the plurality of frames differs from a mean value or a median value of any of $V_L$, $V_R$, $\beta$, and $\gamma$ across the plurality of frames by more than a third threshold;

removing any of the frames for which any of the values differ from the mean value or the median value by more than the third threshold; and determining the one or more calibration parameters based on the unremoved frames.

9. A method implemented by a system on a moving vehicle including an active Doppler sensor, one or more processors, and a storage media storing machine-readable instructions, the method comprising:

obtaining a Doppler velocity from each of one or more entities using the active Doppler sensor, wherein the Doppler velocity is with respect to the moving vehicle;

determining one or more calibration parameters of the active Doppler sensor based on respective Doppler velocities from at least a portion of the entities, wherein the determining of the one or more calibration parameters comprises:

determining one or more stationary entities, within the one or more entities;

forming one or more clusters, each of the clusters comprising at least a portion of the one or more stationary entities and defining a relationship between a location of one of the entities with respect to the active Doppler sensor and the Doppler velocity of the respective one of the entities;

fitting, to each of the one or more clusters, a signal model defining the Doppler velocities of the each of the entities in relation to a mounting offset angle or an azimuth offset angle of the active Doppler sensor and a mounting location of the active Doppler sensor;

determining a degree of fit of the signal model to each of the one or more clusters;

removing any of the clusters having a degree of fit lower than a threshold while retaining remaining clusters; and determining the one or more calibration parameters based on the retained remaining clusters;

determining a location of the vehicle based on one or more of the calibration parameters; and causing the vehicle to perform a driving action based on the determined location.

10. The method of claim 9, wherein the determining the one or more calibration parameters further comprises:

determining the mounting location, the mounting offset angle, a linear velocity component, and a rotational velocity component of the active Doppler sensor.

11. The method of claim 9, wherein the determining the location of the vehicle comprises determining the location of the vehicle by integrating the determined linear velocity component over time or the determined rotational velocity component over time.

12. The method of claim 9, further comprising:

comparing the determined location with a location obtained from a GPS or an IMU.

13. The method of claim 9, wherein:

the signal model is defined by $V_D=V_L \cos(\Theta+\beta)+V_R \sin(\Theta-\beta-\gamma)$, and wherein:

the calibration parameters comprise $V_L$, $V_R$, $\beta$, and $\gamma$;

$V_D$ indicates the Doppler velocity of the each of the entities;

$V_L$ indicates a linear velocity component of the each of the entities in a forward direction of the vehicle;

$V_R$ indicates a rotational velocity component of the each of the entities;

$\Theta$ indicates an angle defining the location of the each of the entities with respect to the active Doppler sensor;

$\beta$ is the mounting offset angle of the active Doppler sensor; and $\gamma$ is defined as $\gamma=\beta-\arctan(y/x)$, wherein y and x define the mounting location of the active Doppler sensor with respect to an ego coordinate system of the vehicle.

14. The method of claim 13, wherein the determining the one or more calibration parameters further comprises:

determining, for each of the retained clusters, a first difference between the linear velocity component and a linear velocity obtained from a GPS or an IMU and a second difference between the rotational velocity component and a rotational velocity obtained from the GPS or the IMU;

removing any of the retained clusters in which the first difference is lower than a first threshold or the second difference is lower than a second threshold;

combining the unremoved clusters;
refitting the signal model to the combined clusters; and
determining $V_L$, $V_R$, $\beta$, and $\gamma$.

15. A non-transitory computer readable medium comprising instructions that, when executed by one or more processors on a moving vehicle, cause the one or more processors to perform:
- obtaining a Doppler velocity from each of one or more entities using an active Doppler sensor on the moving vehicle, wherein the Doppler velocity is with respect to the moving vehicle;
- determining one or more calibration parameters of the active Doppler sensor based on respective Doppler velocities from at least a portion of the entities, wherein the determining of the one or more calibration parameters comprises:
  - determining one or more stationary entities, within the one or more entities;
  - forming one or more clusters, each of the clusters comprising at least a portion of the one or more stationary entities and defining a relationship between a location of one of the entities with respect to the active Doppler sensor and the Doppler velocity of the respective one of the entities;
  - fitting, to each of the one or more clusters, a signal model defining the Doppler velocities of the each of the entities in relation to a mounting offset angle or an azimuth offset angle of the active Doppler sensor and a mounting location of the active Doppler sensor;
  - determining a degree of fit of the signal model to each of the one or more clusters;
  - removing any of the clusters having a degree of fit lower than a threshold while retaining remaining clusters; and determining the one or more calibration parameters based on the retained remaining clusters;
- determining a location of the vehicle based on one or more of the calibration parameters; and
- causing the vehicle to perform a driving action based on the determined location.

* * * * *